(12) United States Patent
Hart et al.

(10) Patent No.: US 6,371,278 B1
(45) Date of Patent: Apr. 16, 2002

(54) PATTY LOADER AND METHOD

(76) Inventors: Colin R. Hart, 117 Turtle Creek Rd., Apt. 3, Charlottesville, VA (US) 22901; Jimmy L. Meyer, 1825 W. Main, Waynesboro, VA (US) 22980

( * ) Notice: Subject to any disclaimer, the term of this patent is extended or adjusted under 35 U.S.C. 154(b) by 0 days.

(21) Appl. No.: 09/434,154

(22) Filed: Nov. 4, 1999

(51) Int. Cl.[7] ............................................. B65G 29/00
(52) U.S. Cl. ............................ 198/463.4; 198/459.6; 198/462.2
(58) Field of Search ..................... 198/463.4, 459.6, 198/462.2

(56) References Cited

U.S. PATENT DOCUMENTS

| 334,274 A | 1/1886 | Norton |
| 1,166,492 A | 1/1916 | Tevander |
| 1,330,596 A | 2/1920 | Lowree et al. |
| 1,503,521 A | 8/1924 | Strandt |
| 1,720,907 A | 7/1929 | Koerner |
| 1,985,897 A | 1/1935 | Huntar |
| 2,007,981 A | 7/1935 | Nordquist |
| 2,292,400 A | 8/1942 | Nordquist |
| 2,304,905 A | 12/1942 | Gantzer |
| 2,570,265 A | 10/1951 | Nordquist |
| 2,646,869 A | 7/1953 | Kay |
| 2,703,668 A | 3/1955 | Baechle |
| 2,733,724 A | 2/1956 | Warren |
| 2,744,608 A | 5/1956 | Ardell et al. |
| 2,874,701 A | 2/1959 | Stelzer |
| 2,888,125 A | 5/1959 | Engelson et al. |
| 2,910,167 A | 10/1959 | Phin |
| 2,942,720 A | 6/1960 | Fouse |
| 2,991,869 A | 7/1961 | Packman |
| 3,104,752 A | 9/1963 | Rudszinat |
| 3,232,414 A | 2/1966 | Brigham et al. |
| 3,812,949 A | 5/1974 | Lugh |
| 4,043,442 A | * 8/1977 | Greenwell et al. ........... 198/420 |
| 4,261,456 A | 4/1981 | Scarpa et al. |
| 4,261,457 A | 4/1981 | van Maan |
| 4,355,712 A | 10/1982 | Bruno |
| 4,462,516 A | * 7/1984 | Guerzoni ..................... 198/427 |
| 4,535,881 A | 8/1985 | Mims |
| 4,564,104 A | 1/1986 | Anderson |
| 5,291,985 A | 3/1994 | Spatafora et al. |
| 5,501,316 A | 3/1996 | Hermening et al. |
| 5,813,512 A | 9/1998 | Andersson et al. |
| 5,979,634 A | 11/1999 | Odegard et al. |

* cited by examiner

Primary Examiner—Joseph E. Valenza
Assistant Examiner—Rashmi Sharma
(74) Attorney, Agent, or Firm—Liniak, Berenato, Longacre & White, LLC

(57) ABSTRACT

An apparatus and method for stacking and loading disc-like objects into receptacles is provided. The apparatus includes a lane combining conveyor which receives multiple lanes of product and combines one or more of the outer lanes into the remaining lanes. A stack former is provided for forming individual stacks of patties which are side supported onto rails. The rails can be pivoted down to divert patties for clearing jams. After the product is formed on the stack formers, a stack transfer mechanism transfers the stacks of products formed on the stack forming rails to the matrix former. Matrix former receives individual rows of multiple stacks from the stack transfer mechanism. A stripper mechanism is used to ensure that the stacks are not scrambled during this transfer. Once the matrix former is filled with product, a case rollover mechanism is rotated to the matrix former. Both the case and the matrix former are rotated back together to bring the case to the upright position and transfer the stacks into the case. The matrix former is then removed from the case with a vertical motion and rolled back into position to receive stacks from the stack transfer mechanism.

19 Claims, 24 Drawing Sheets

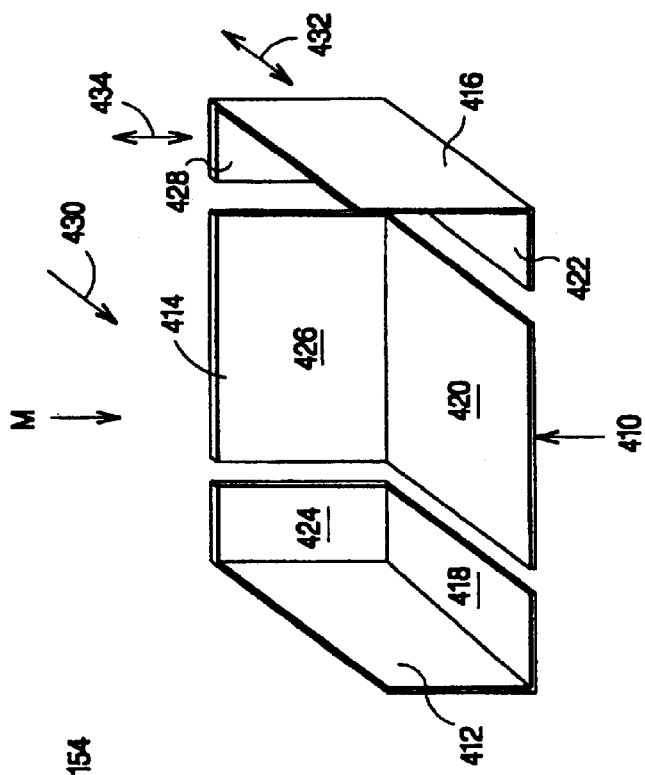
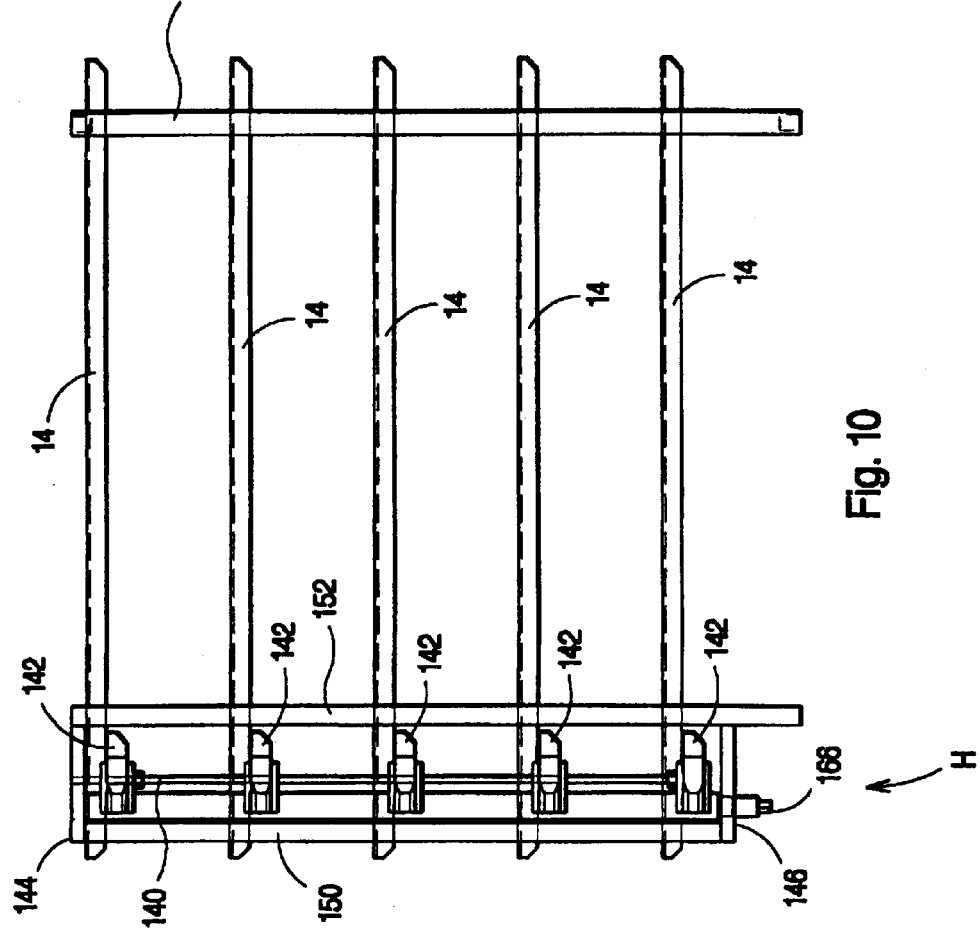
Fig. 19
Fig. 10

PATTY LOADER AND METHOD

FIELD OF THE INVENTION

The disclosed invention is to a product loading apparatus for orientating, stacking, and packaging discrete food products. More specifically, the invention is to a product loading machine and method of use in which disc-like objects, such as frozen hamburger patties, are oriented, arranged into stacks, and placed into boxes or similar sorts of packages. The contents of copending patent application Ser. No. 09/026,772 filed on Feb. 20, 1998 are incorporated herein by reference.

BACKGROUND OF THE INVENTION

Frozen hamburgers, chicken patties, and other disc-like food products typically are prepared by a manufacturer on one piece of equipment, and then manually loaded into boxes or similar packaging with a separate packaging machine. Manufacturers of hamburger patties will form patties with a production machine. After being formed, they are fed into a freezer. After leaving the freezer, they are screened by a metal detector which ejects contaminated patties. The patties are then typically conveyed to a stacking machine. The frozen patties are manually placed into boxes. The number of patties in the boxes will vary, based upon size of the patties and the efficiency of the stacker.

Prior stacking machines typically form a large number of lanes of food product, generally more lanes than the number of stacks that will fit in the box. It is difficult to form stacks for each lane, and then form a pattern of stacks which will fit in each case.

Changing the dimensions of the box or carton negatively effects the length to width ratios of the box, resulting in receptacles which are awkward and imbalanced. Moreover, the patties may be of varying size, so the stacking machines have a difficult time accommodating product of varying sizes. Thus, there is a need in the art for a lane combining conveyor system which reduces the number of lanes of food product to the number of stacks required to fit lengthwise in a case.

Coil-type stackers are sometimes placed at a drop off from the conveyor system so that product will be dropped and stacked between the turns of the coils. When the patties are randomly dropped onto the side of the coil, a patty may occasionally contact the edge of the coil, causing the patty to be improperly positioned in the stack. Even coil stackers, however, require an operator to remove the products, and place them into the box. Improperly positioned product causes inconsistent forming of the stack of patties. This inconsistency makes it impossible to automate the transferring of the stacks of patties.

The common industry practice for loading patties into a case is to load them manually, after the food products are formed into continuous stacks by a coil type stacker. The operator will then pick up partial stacks of about 5–10 patties, and place them into the case. Robots have been used to place the patties into the box or carton, but robots are expensive and may have difficulty should product size change.

The disclosed invention achieves these needs and others by providing a lane combining conveyor, used in connection with a stack former, a stack transfer mechanism, a matrix former, and a case rollover mechanism. The disclosed invention automatically sorts the patties into a number of lanes corresponding to the number of stacks in the carton, assembles them into stacks of predetermined number of patties, and then causes the stacks to be positioned within a carton.

The invention operates essentially automatically, can be adjusted as to the number of stacks and the number of patties in a stack, and avoids the need for an operator to manually place the stacks into a carton.

SUMMARY OF THE INVENTION

A lane combining conveyor system for combining a plurality of lanes of products fed across the system comprises a first conveyor for advancing a plurality of lanes of product in a machine direction. A second elevating conveyor is disposed adjacent to the first conveyor for advancing at least one lane of product in the machine direction. A cross feed conveyor communicates with the second conveyor, and extends at an angle thereto for accumulating a predetermined supply of product. A controller is operably associated with the first and cross feed conveyors for limiting movement of the product in the machine direction along the first conveyor beyond a preselected location after a predetermined supply of product has accumulated on the cross feed conveyor. A pusher is operably associated with a cross feed conveyor for removing accumulated product therefrom in response to operation of the controller, and for thereafter permitting movement of the food product in the machine direction along the first conveyor.

A system for stacking product comprises a conveyor for advancing product from a first elevated location. A first set of dividers extends from the first elevated location to a second location. A plurality of sheets are pivotally secured to adjacent rows of the first set of dividers for directing the flow of product. Each sheet has an entry portion and exit portion. A plurality of rotatable stacking coils extend angularly outwardly between adjacent rows of the second dividers for receiving product between turns of the coils. A drive rotates the coils. A controller pivots each sheet in synchronization with the rotation of the associated coil, so that each exit portion remain aligned between turns of the associated coil, and thereby directs product between the turns.

A system for packaging a stack of disc-like product comprises a rotatable coil for advancing disc-like product beyond a first position. A transfer head is pivotable between a first product receiving orientation and a second product dispensing orientation. A plurality of jaws are carried by the transfer head. The jaws have a first closed position defining a receptacle for receiving product accumulated by the coil. At least one of the jaws is pivotal into a second open position, permitting the transfer head to be pivoted into the first orientation from the second orientation without encountering product accumulating on the coil.

A system for stacking disc-like objects comprises a matrix former comprising a three-sided open receptacle. A plurality of transfer heads are pivotal between a first product receiving orientation and a second product dispensing orientation disposed with the matrix former for placing stacks of objects therein in a row. A controller is operably associated with the matrix former, for moving the matrix former in a first direction as a first row is received in order to permit receipt therein of a second row and for moving the matrix former in an axial direction for permitting product to be removed from the transfer heads.

A system for packaging product comprises a matrix former comprising a three-sided open receptacle. The matrix former is pivotal about at an axis between a first upright position and a second inverted position. The matrix former receives stacks of product. A case rollover mechanism is operably associated with the matrix former. The case rollover mechanism rotates a receptacle about the first axis from a first open orientation to a second orientation positioned over the matrix former. Then the matrix former rotates the case rollover mechanism and the case to the first orientation, thereby inverting the matrix former and emptying product from the matrix former into the receptacle.

A loading system comprises a lane combining conveyor for reducing the number of lanes of product fed from a standard conveyor. A plurality of sheets are disposed at an outfeed of each lane. Each sheet has an entry portion and exit portion, and is pivotally mounted at its entry portion. A plurality of rotatable stacking coils extend angularly outwardly from between adjacent sheets to receive product between the turns of the coil and thereby form a stack. A controller pivots each sheet in synchronization with rotation of the associated coil, for thereby directing product between the turns. A transfer head is pivotal between a first product receiving orientation and a second product dispensing orientation for transferring a stack. A matrix former receives stacks from the transfer heads. A case rollover mechanism is operably associated with in the matrix former for receiving product from the matrix former.

A method of combining a plurality of lanes of product comprises the step of advancing a plurality of lanes of product along a conveyor in a first machine direction. At least one lane of product is reoriented in a cross machine direction. Movement of the product along the first conveyor is limited beyond a preselected location after a predetermined supply of product has accumulated in the cross machine direction, while products accumulated in the cross machine direction are simultaneously discharged into the first machine direct-on.

A method for packaging product comprises the steps of raising a matrix former into position to receive stacks of product from a stack transfer mechanism. The stack transfer mechanism is rotated into the matrix former. A stack stripper is engaged, and stacks are positioned thereby within the matrix former. The matrix former is lowered, thereby causing the stacks to be stripped from the stack transfer heads.

These and other objects and advantages of the invention will be readily apparent in view of the following description and drawings of the above-described invention.

BRIEF DESCRIPTION OF THE DRAWINGS

The above and other objects and advantages and novel features of the present invention will become apparent from the following detailed description of the preferred embodiment of the invention illustrated in the accompanying drawings:

FIG. 10 is a plan view with portions shown in phantom of the dividers of first conveyor and the hold back mechanism;

FIG. 11(a) is a front elevational view of the driver wheel;

FIG. 15(a) is a fragmentary elevational view of adjacent stacking rails supporting stacks;

FIG. 19 is a perspective view of the matrix former;

DETAILED DESCRIPTION OF THE PREFERRED EMBODIMENT

Figure 1:
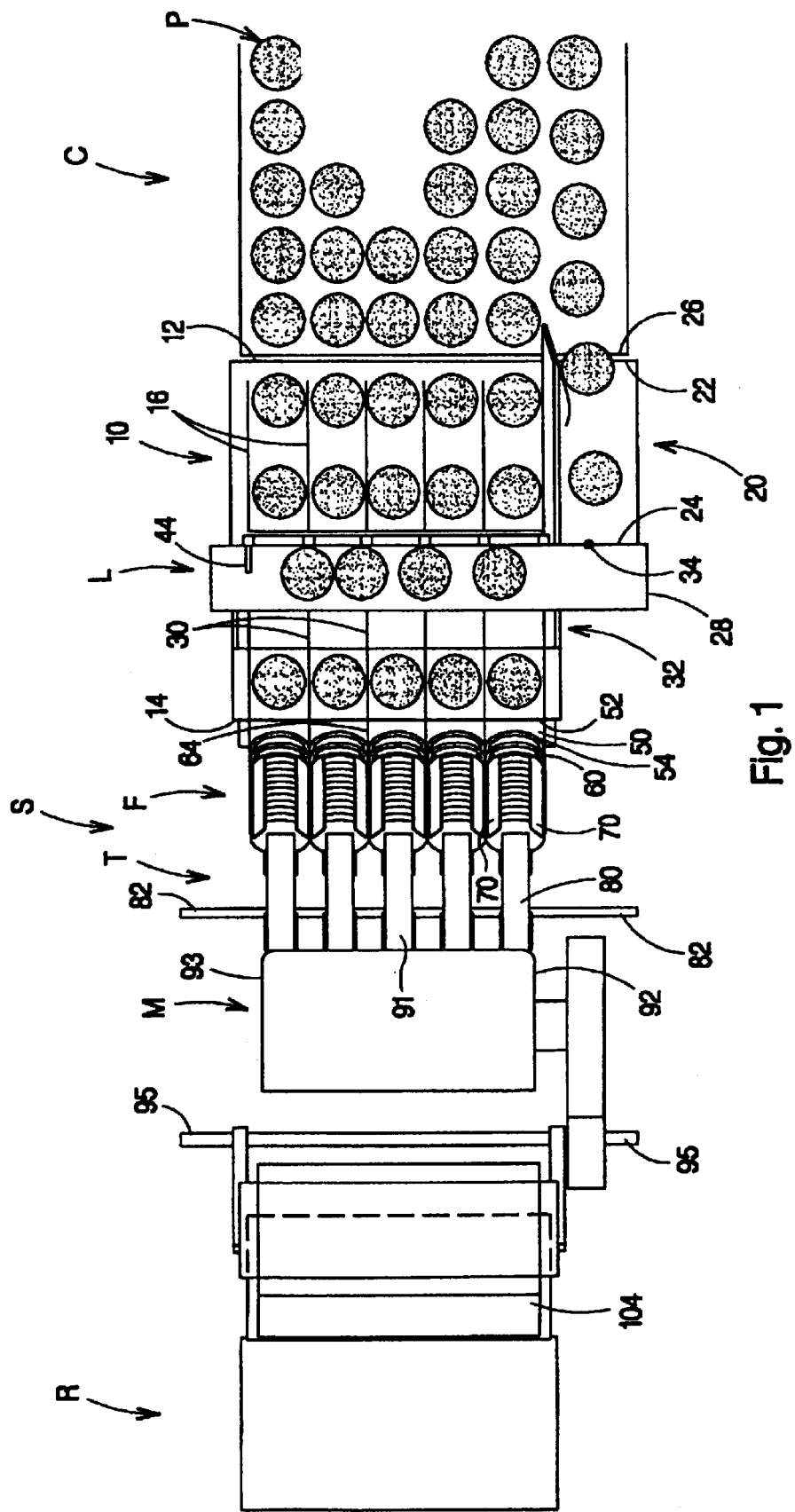
FIG. 1 is a plan view of the loading system of the invention.

Loading system S, as best shown in FIG. 1, includes a lane combining conveyor system L, a stack former F, a stack transfer mechanism T, a matrix former M, and a case rollover mechanism R. The loading system S is designed to be aligned with a product conveyor C to receive product P disposed in a series of rows. The conveyor C conveys disc-like products from a forming machine to a packaging machine. The present invention was particularly designed to sort, stack, and package frozen hamburger patties. The present invention may be used to stack other disc-like products, such as frozen chicken patties, frozen sausage patties, or the like.

Conveyor C supplies a single layer of products in a plurality of rows to be stacked by loading system S. The number of rows of product P conveyed by conveyor C is greater than the number of rows or stacks that will fit in a standard package, such as a box or carton. Thus, lane combining conveyor system L functions to reduce the number of lanes of product received from conveyor C to that number of stacks to be oriented within the carton. While we illustrate conveyor C as having six rows of product, the number of rows will be a function of the product being formed on the forming head being used.

Lane combining conveyor L receives the product P and includes a first conveyor 10 which advances a plurality of lanes of product in a machine direction represented by arrow 11.

First conveyor 10 has an entrance end 12 and an exit end 14. First conveyor 10 is made from a durable plastic, so as to not damage the food product as it is advanced on the conveyor and which may be cleaned as needed. Conveyor C may be made of other materials which will not readily damage the product. In the preferred embodiment, first conveyor 10 includes a first set of dividers 16, which are spaced so that five lanes of product are advanced from the entrance end 12 to exit end 14. The dividers 16 are uniformly spaced so that the product P is uniformly conveyed across first conveyor 10. However, it should be understood that conveyor 10 can be divided to have any number of lanes, to accommodate product of different sizes. That is, the number of dividers 16 may be increased or decreased to accommodate product of increased or various size.

Aligned adjacent to the first conveyor 10 is second elevating conveyor 20, which advances product P in machine direction 11 along an angularly upwardly disposed path. Second conveyor 20 includes an entrance end 22 and an exit end 24. Preferably, second conveyor 20 is made from the same material as conveyor 10. The entrance ends 12 and 22 of the conveyors 10 and 20 are aligned with an outfeed portion 26 of conveyor C. In the preferred embodiment, conveyor C advances six rows of product, divided into five lanes being received by first conveyor 10 and one lane being received by the second elevating conveyor 20. The combined number of lanes of first conveyor 10 and second conveyor 20 should be equal to the total number of rows of product fed across the standard conveyor C.

Figure 2:
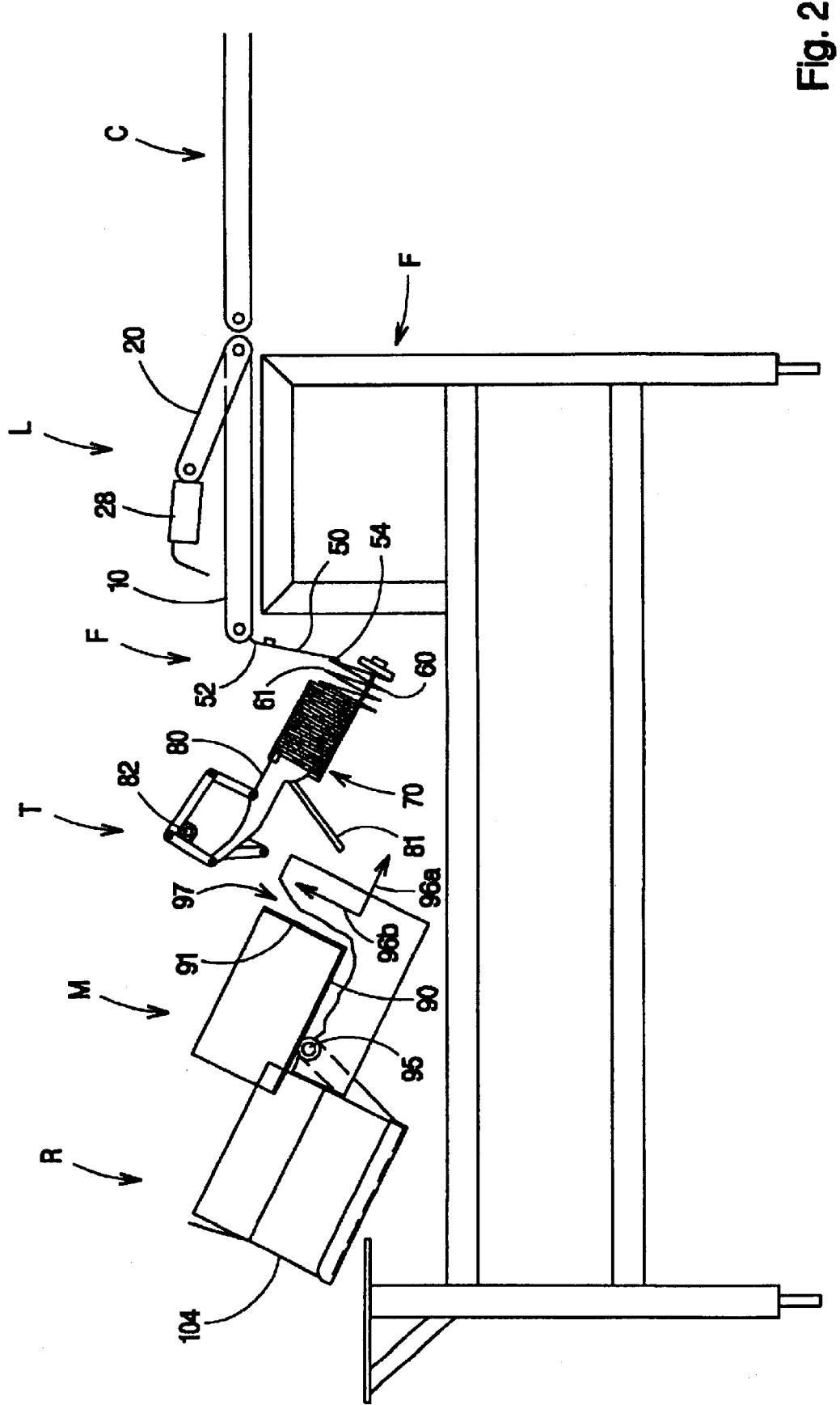
FIG. 2 is a side elevational view with portions broken away showing the transfer head and a stack being accumulated by the coil stacker.

Upon reaching the upper exit end 24 of conveyor 20, the product P fed from the second conveyor 20 is received onto cross feed conveyor 28. The cross feed conveyor 28 is disposed at 10 the exit end 24 of second conveyor 20, and extends at an angle thereto. Preferably, the cross feed conveyor 28 and second elevating conveyor 20 are disposed perpendicularly. The cross feed conveyor 28 is bridged across and above first conveyor 10, so that product P will continue to advance on first conveyor 10 beneath the cross feed conveyor 28, as best shown in FIG. 2.

That is, the plane of cross feed conveyor 28 is parallel to yet disposed above the plane of first conveyor 10. Cross feed conveyor 28 is also preferably made from the same material as conveyor 10.

First conveyor 10 includes a second set of dividers 30, which are aligned with the first set of dividers 16. Second dividers 30 keep the product P uniformly disposed across first conveyor 10. The first set of dividers 16 extends from the enhance end 12 to the cross feed conveyor 28, while the second set of dividers 30 extends from the cross feed conveyor 28 to the exit end 14.

Preferably, the second set of dividers 30 are elongated metal sheets which extend to the height of cross feed conveyor 28.

Cross feed conveyor 28 reorients product P received from second elevating conveyor 20 in a cross machine direction represented by arrow 32. Once the product P on the cross feed conveyor 28 is aligned with the lanes of first conveyor 10, then product P is advanced into the lanes of first conveyor 10. At the same time, as will hereinafter be explained, product P on conveyor 10 is prevented from advancing beyond a predetermined position.

A controller 34 is disposed above the exit end 24 of second conveyor 20 and determines when a predetermined amount of product P has accumulated on cross feed conveyor 28. Controller 34 determines when the number of patties accumulated on the cross feed conveyor 28 is equal to the number of lanes of product fed by conveyor 10. Once the predetermined supply of product is determined by controller 34, the product P on first conveyor 10 is stopped from advancing beyond the cross-feed conveyor 28.

In the preferred embodiment, the controller 34 includes an optical sensor which counts the number of patties accumulated on the cross feed conveyor 28. Once a predetermined number of products P have been accumulated on the cross feed conveyor 28, a patty hold back mechanism H hereinafter explained, disposed beneath the cross feed conveyor 28, is operated to obstruct the path of the product P on first conveyor 10 beyond cross feed conveyor 28. This hold back mechanism H stops the lanes of product P on the first conveyor 10 from advancing beyond cross feed conveyor 28. Conveyor 10 continues to advance however, even though the product P therein does not advance beyond conveyor 28. A space is thus created for the product P row oriented into alignment on cross feed conveyor 28.

Figure 11:
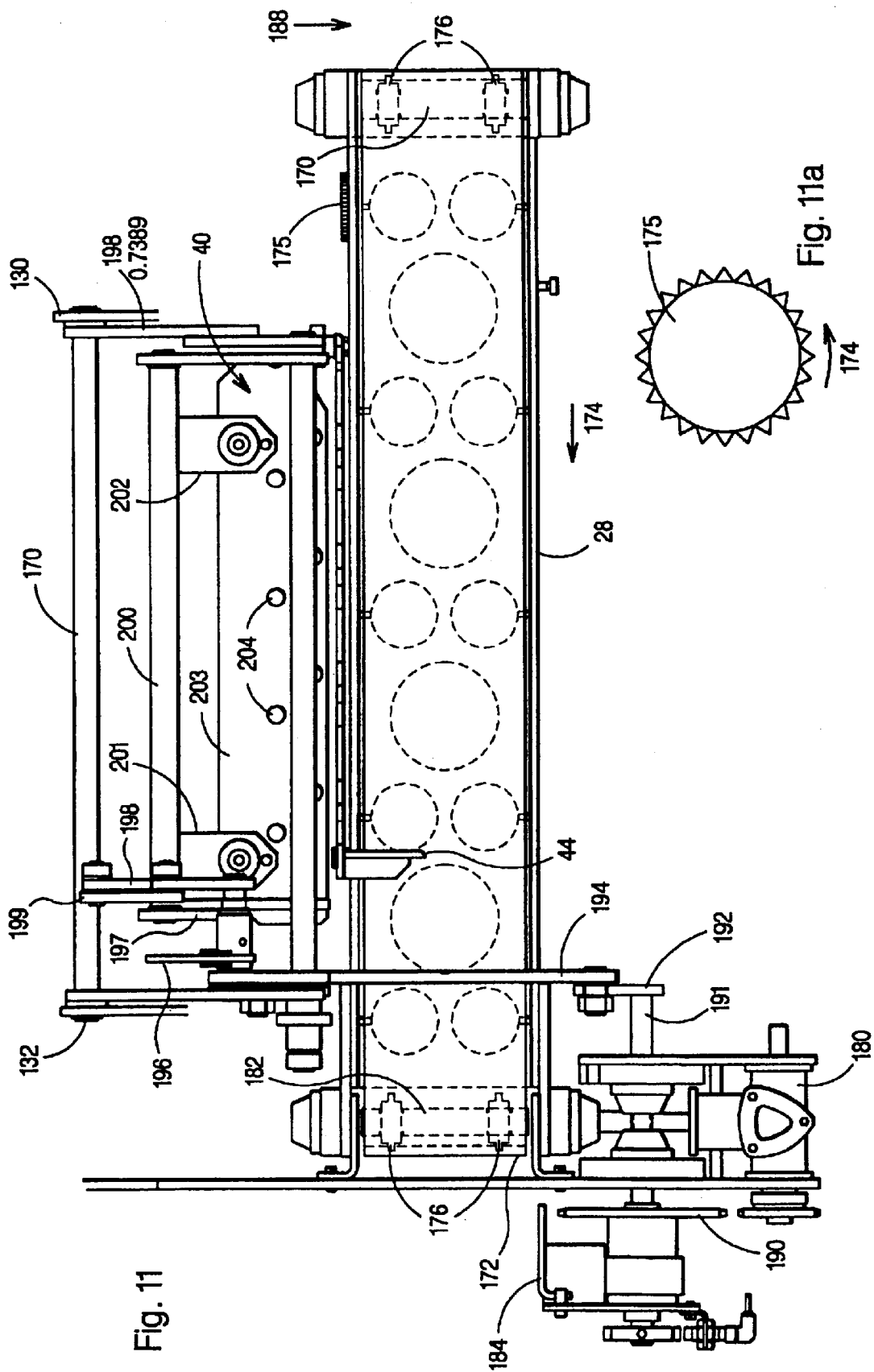
FIG. 11 is a plan view with portions shown in phantom of the cross feed conveyor and pushers.

Once hold back mechanism H has been actuated to prevent product P from advancing beyond conveyor 28, a plurality of row pushers 40 are actuated to transfer the row of product accumulated on the cross feed conveyor 28 to the first conveyor 10, as best shown in FIG. 11, and as will hereinafter be explained. Row pushers 40 are disposed adjacent to cross feed conveyor 28, so that product accumulated on cross feed conveyor 28 may be advanced in the machine direction 11. Cross feed conveyor 28 also includes fence 44, as best shown in FIG. 1, for aligning the product P accumulated on cross feed conveyor 28, and preventing the product from being advanced off the cross feed conveyor 28. After the product P accumulated on cross feed conveyor 28 is pushed off the conveyor 28 and onto the first conveyor 10, the row pushers 40 are retracted. When the row pushers 40 are retracted, the pushers 40 are raised slightly to clear the incoming product P on the cross feed conveyor 28.

As best shown in FIGS. 1–8, stack former F is downstream of first conveyor 10. Stack former F includes pivotal entry sheets 50, each having an entry portion 52 and an exit portion 54. Preferably, the pivotal entry sheets 50 slope downwardly from first conveyor 10 at a 60° angle. As product P is conveyed off first conveyor 10, it slides down pivotal entry sheets 50. In the preferred embodiment, there are five entry sheets 50, one entry sheet associated with each lane of product fed from first conveyor 10. There should be as many entry sheets 50 as there are lanes in first conveyor 10.

Figure 12:
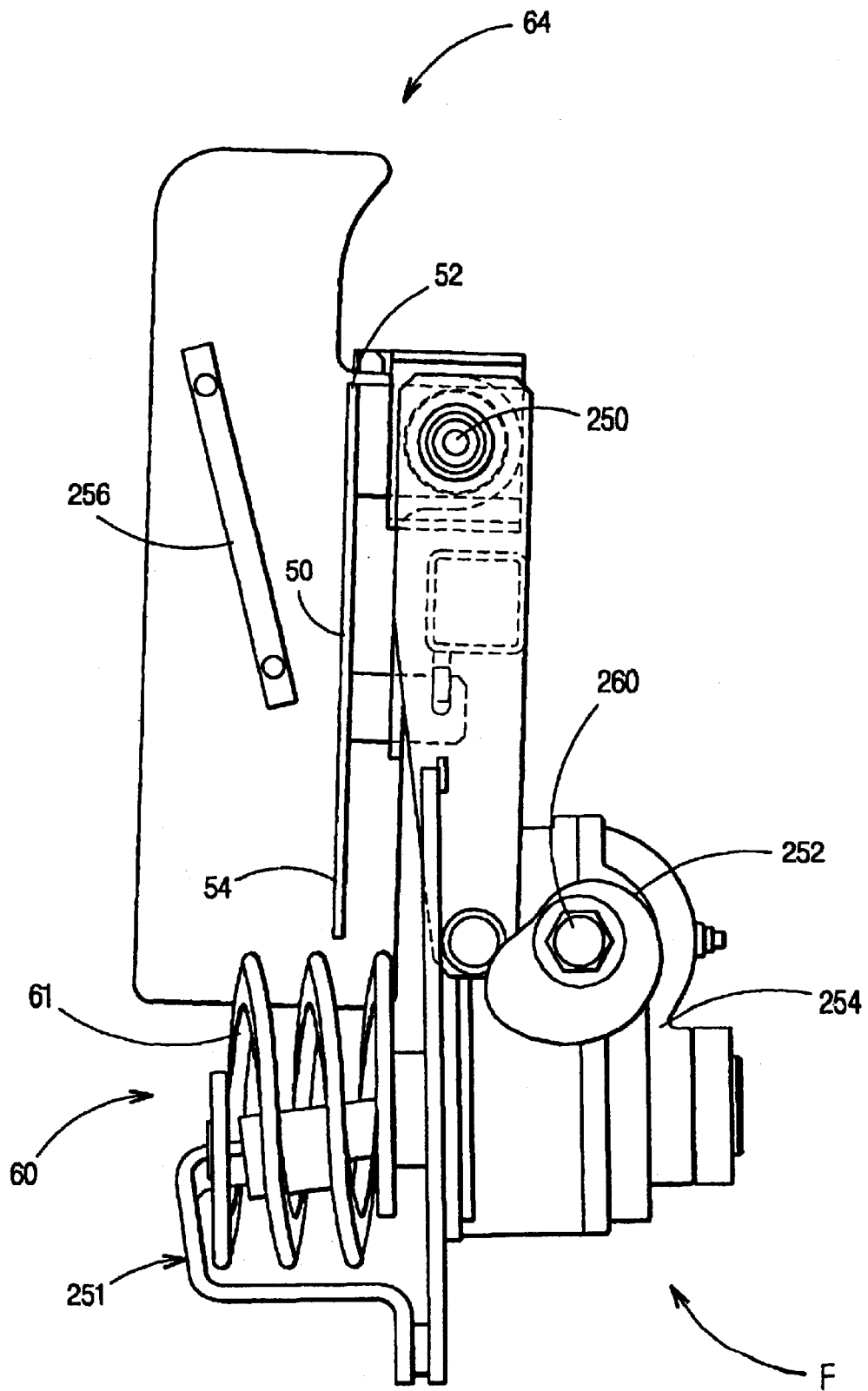
FIG. 12 is a side elevational view with portions shown in phantom of a pivotal sheet associated with a stacking coil.
Figure 13:
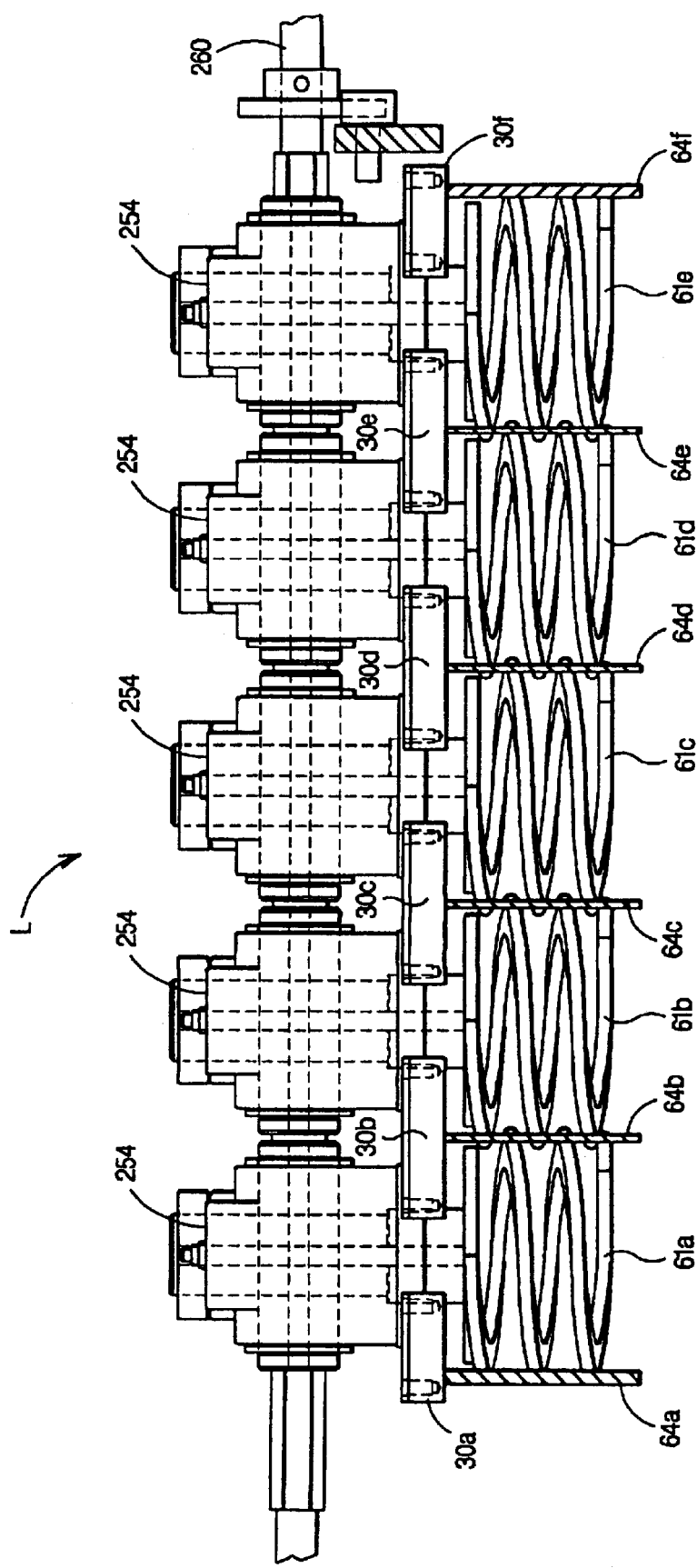
FIG. 13 is a plan view of the stacking coils with portions shown in phantom.
Figure 14A:
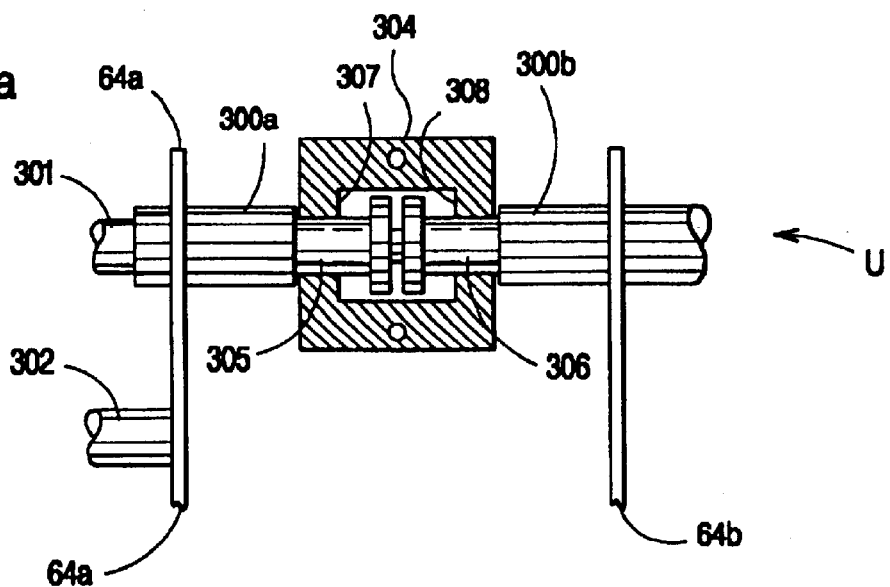
FIG. 14 is a plan view with portions shown in phantom of the lanes of the pivotal entry sheets mounted to their support.
FIG. 14(b) is a front elevational view with portions broken away of an upper and lower joint member.
Figure 13A:
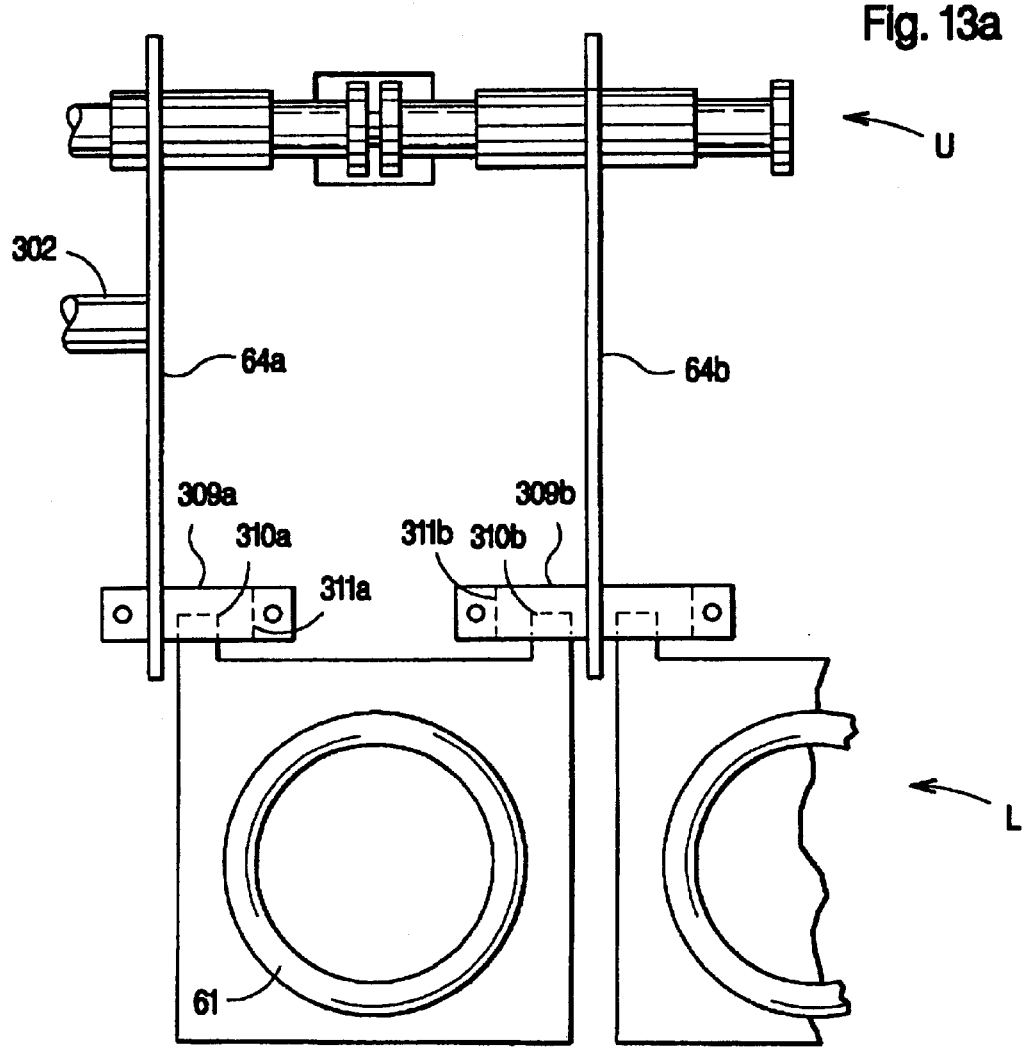
FIG. 13(a) is a front elevational view with portions shown in phantom of an upper joint member.
Figure 14:
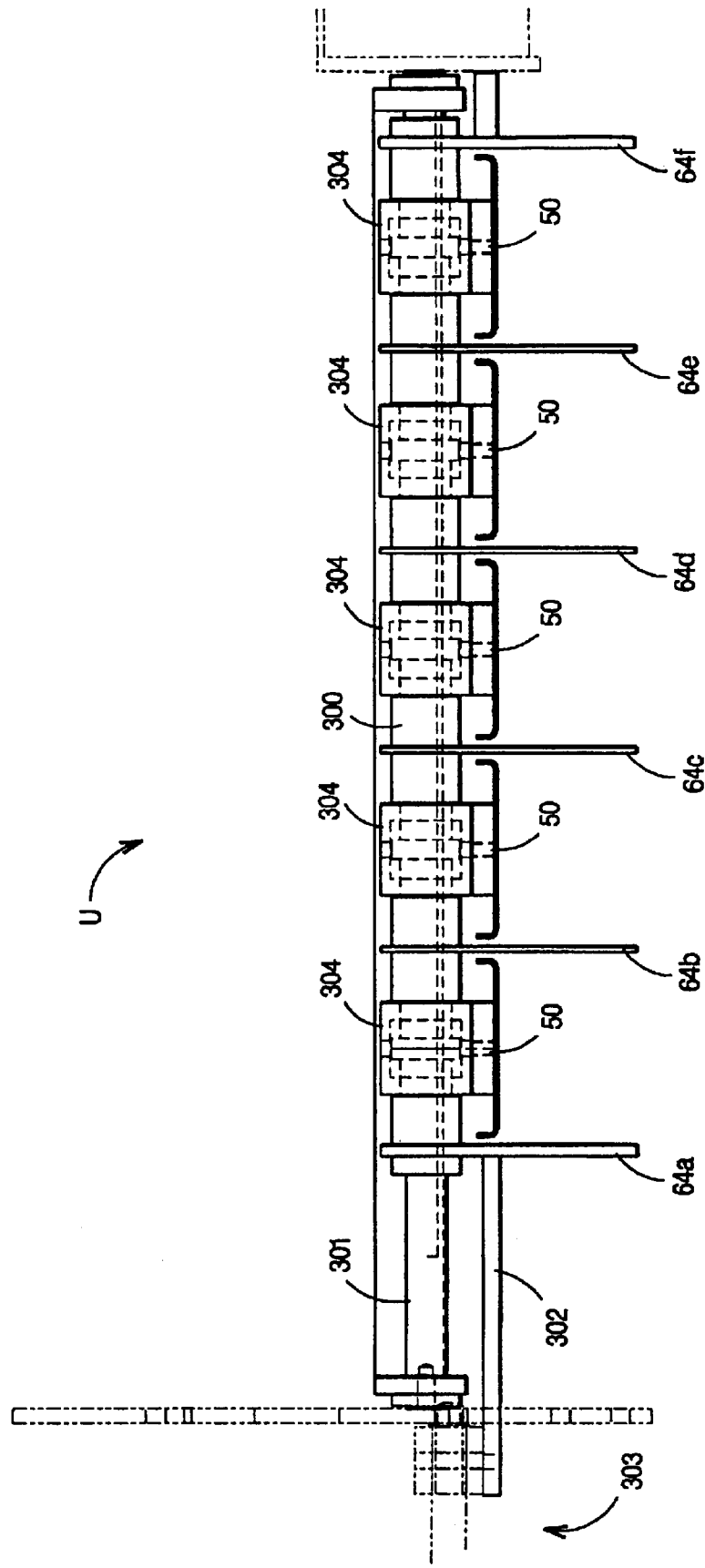

Entry sheets 50 are pivotally secured at their entry portions 52, to permit movement of exit portions 54. Disposed at the exit portions 54 of each entry sheet 50 is a coil type stacker 60. Thus, after product P conveyed by first conveyor 10 slides down pivotal entry sheets 50, the product P is dropped onto coil type stackers 60. As best shown in FIGS. 12,13, and 14' each entry sheet 50 includes a divider 64 maintaining the product P separated as each lane of product is dropped into coil stackers 60. The dividers 64 are aligned with the dividers 16 and 30 of first conveyor 10.

When the product P reaches the end the first conveyor 10, it slides down the pivotal entry sheets 50 and onto coil stackes 60. One coil stacker 60 is provided for each lane of product conveyed from first conveyor 10. In the preferred embodiment, there are five coil-type stackers 60 for each five lanes of first conveyor 10 and five pivotal sheets 50.

The lower ends of pivotal sheets 54 move with the flights or turns of the coils 61 of the coil-type stackers 60, as will be further described below. This alignment helps prevent the product P from stabbing the side of the flight when entering the coil stackers 60. Moreover, because the exit portions 54 remain aligned between the turns of the coils 61 of coil stackers 60, then product P is more efficiently positioned between the turns, hence, productivity is increased and product damage minimized. The coil stackers 60 extend angularly outwardly between adjacent rows of dividers 64 for receiving product between turns of coils 61.

Disposed at the ends of the coil stackers 60 are side support rails 70. Side support rails 70 are positioned beneath and extend outwardly beyond coil stackers 60 to provide the support for the product P as it accumulates on stackers 60. Two rails 70 are associated with each coil stacker 60, with adjacent stackers 60 sharing adjacent rails 70. With reference to FIG. 2, the rails 70 are preferably angled at a 30° incline from the horizontal. The rails 70 extend beyond the coils 61 in order to permit product P to be advanced while a stack is being formed between the coils 61. Rails 70 align product P in the preferred orientation, and cause product P to be axially advanced as the coils 61 rotate. In addition, rails 70 may be pivoted downwardly at the stackers 60, to allow product to fall into a container should a jam occur.

After a stack is formed by all of stack formers F, then a stack transfer mechanism T associated with each stacker 60 transfers the stacks into packages. Stack transfer mechanism T includes a plurality of transfer heads 80, associated with and positioned in front of the exit end of each coil stacker 60. Transfer heads 80 transfer stacks of product accumulated on rails 70 to a packaging station. A plurality of jaws are carried by each transfer head 80, and include stationary jaws and a movable jaw 81. The jaws surround the stacked product on rails 70, and transfer the product P to a packaging station. The jaws have a first closed position, defining a receptacle for receiving product accumulated by the coils 61, wherein the stationary jaws and the movable jaw are substantially parallel. With reference to FIG. 2, the movable jaw 81 is illustrated in its second open position, which allows the transfer heads 80 to be placed about a stack, without the movable jaw 81 engaging the stack. Once the transfer heads 80 are placed about the stack, the movable jaw 81 is pivoted to its third position, just shy of its fully closed position. The third position decreases the response time of the movable jaw 81 as it is pivotable to its first closed position. Once a full stack is accumulated on the rails 70, the movable jaw 81 is pivoted towards rails 70, defining a closed receptacle engaging the stack. In this way, the stack is surrounded and ready to be lifted from rails 70.

Figure 3:
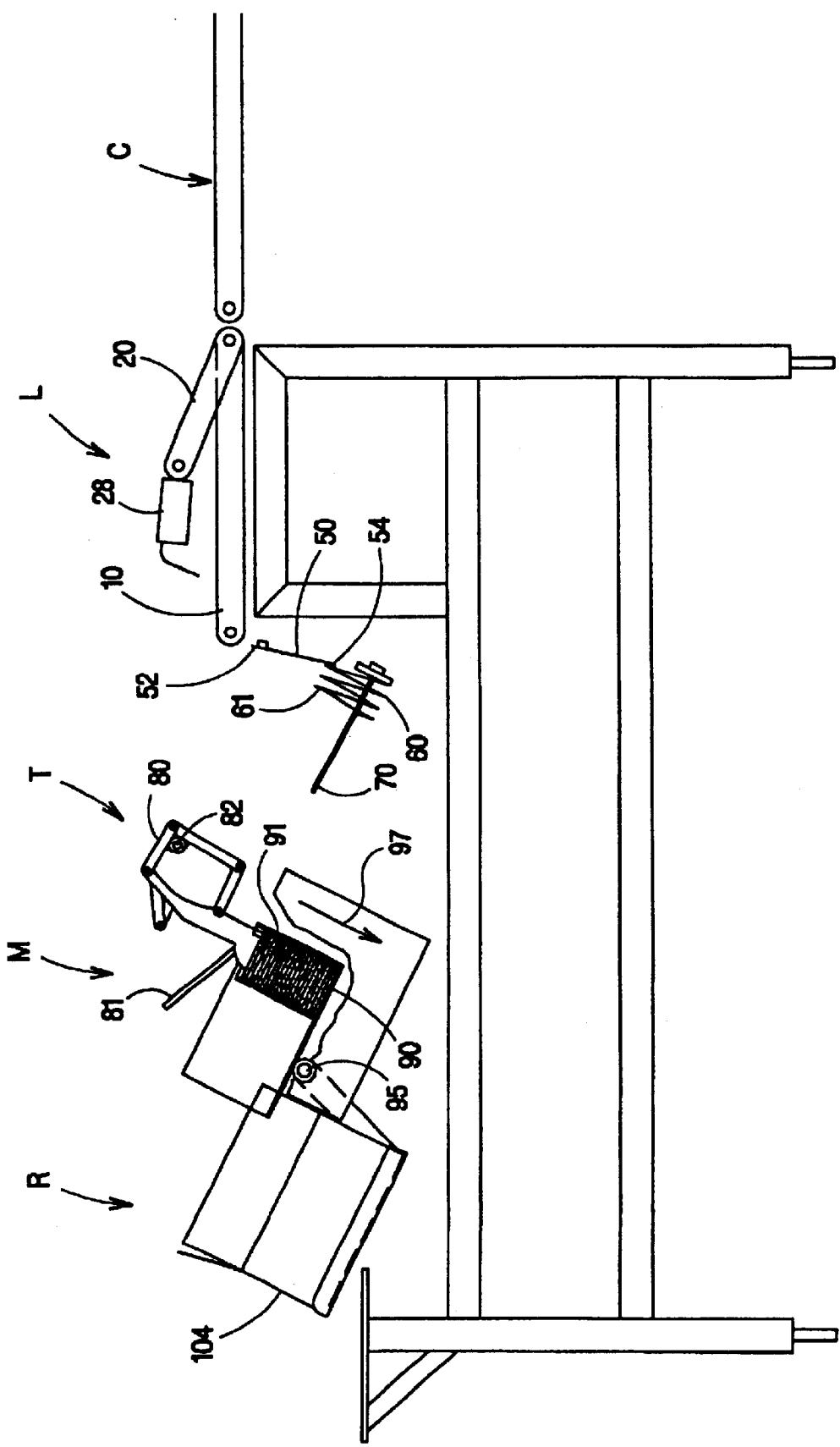
FIG. 3 is a side elevational view showing the transfer head after it has rotated the product into a matrix former.

The transfer heads 80 are connected to a shaft 82, which pivots the transfer heads 80 from a first product receiving orientation, where the jaws are substantially parallel to rails 70, to a second product dispensing orientation where the jaws are substantially perpendicular to base 90 of matrix former M, as best shown in FIG. 3. Preferably, the transfer heads 80 are rotated about 270°, so that stacks may be transferred into matrix former M. The stationary jaws are disposed above the forming stack, with the movable jaw 81 normally in the open position of FIG. 2.

With reference now to FIGS. 1–4, each transfer head 80 moves individually when a stack has been received by each respective transfer head 80. Once a stack is accumulated within a transfer head 80, a signal from the control panel is sent to an air cylinder which closes the movable jaw 81, grabbing the stack. After all movable jaws 81 are closed, transfer heads 80 retract in unison. When transfer heads 80 are all retracted, shaft 82 rotates the stacks to matrix former M.

Figure 4:
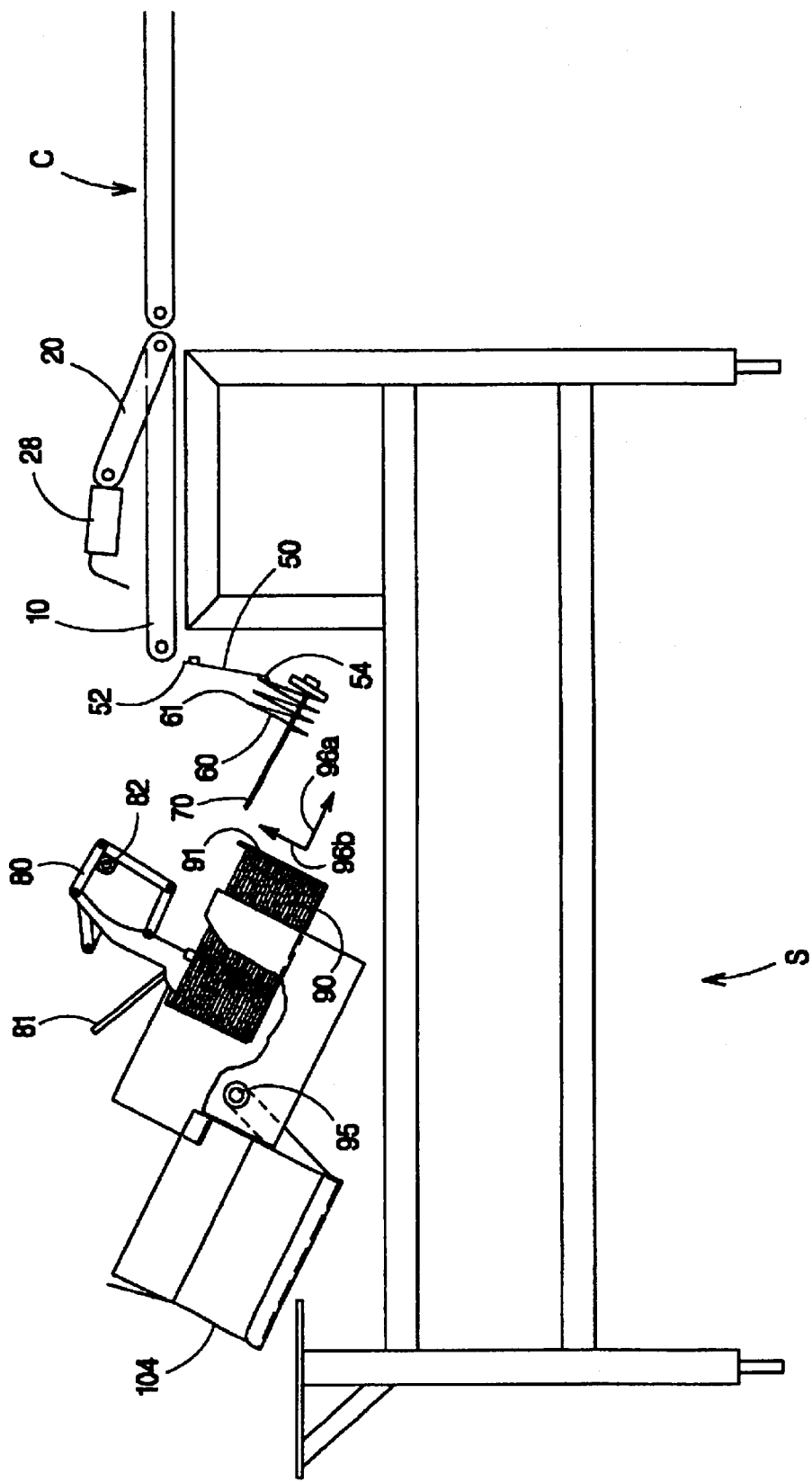
FIG. 4 is a side elevational view showing a fully loaded matrix former with a transfer mechanism rotated to insert the last stack of product.

Matrix former M is a three-sided open receptacle, which is positioned to receive multiple rows of product from transfer heads 80. Matrix former M includes a base portion 90, a back side portion 91, and lateral side portions 92 and 93. The back side portion 91 is disposed adjacent and closest to the stack transfer mechanism T. With reference to FIG. 1, matrix former M is rotatable about shaft 95. With reference to FIG. 4 matrix former M can also shift inwardly in the direction of arrow 96(*a*), and upwardly in the direction of arrow 96(*b*) with respect to transfer heads 80.

With specific reference to FIG. 2, the matrix form M is raised upwardly in the direction of arrow 96(*b*) to receive stacks of product P collected by transfer heads 80. Transfer heads 80 rotate into the matrix former M to dispense the rows of product accumulated, as illustrated in FIG. 3. After the transfer heads 80 have rotated into matrix former M, then the movable jaw 81 of each transfer heads 80 is opened. This releases the product P, permitting same to remain in the matrix former M after the transfer heads 80 rotate about shaft 82 to stack former F. Matrix former M is then lowered axially in the direction of arrow 97 to its initial position. A stripper mechanism aids in removing the product P from the transfer heads 80 by putting pressure on top of the stacks as the matrix former M is lowered. The transfer heads 80 are then rotated back to the coil stack formers 60. Matrix former M, as illustrated in FIG. 4, is then moved inwardly in the direction of arrow 96(*a*) to accept the next row of stacks. This permits the matrix former M to be filled, without stacks being placed upon each other. Preferably, matrix former M is disposed at an angle to the horizontal, so that each stack of product P lays against the back side portion 91. This operation is repeated until the matrix former M is completely filled with stacks of patties.

Figure 8:
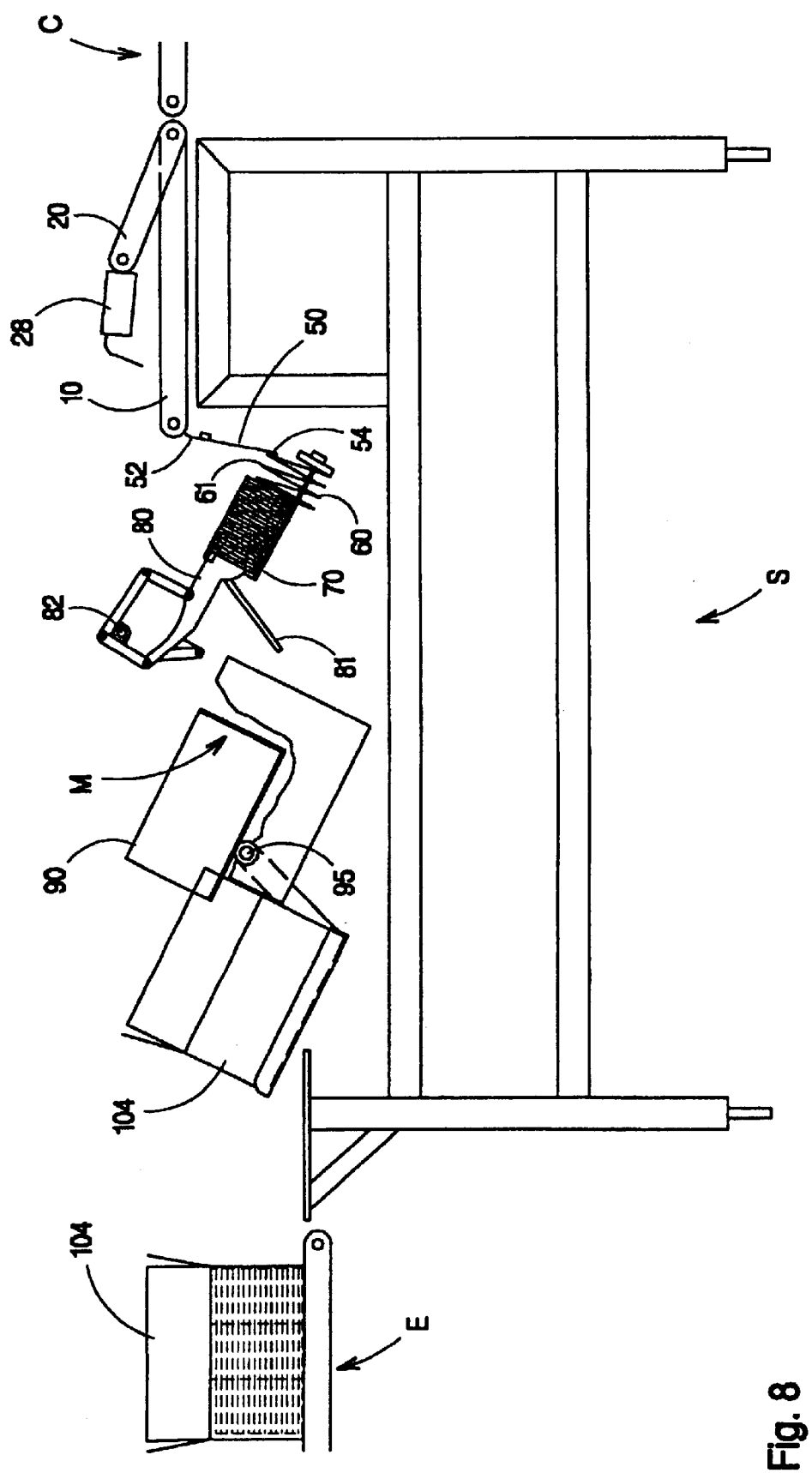
FIG. 8 is a side elevational view showing a loaded case on a conveyor belt and the loading system reset to load product in a case.

Once the matrix former M is completely filled with stacks of product, the stacks must be transferred to a carton. Case rollover mechanism R, as best shown in FIGS. 1 and 8, is disposed adjacent matrix former M for receiving the stacks formed within the matrix former M. Case rollover mechanism R is adapted to receive a carton, box, or similar container 104. The case rollover mechanism R has an initial load position, where the carton 104 is in a generally upright, open position as best shown in FIG. 4, and a rotated position, where carton 104 is inverted, as best shown in FIG. 5.

Figure 5:
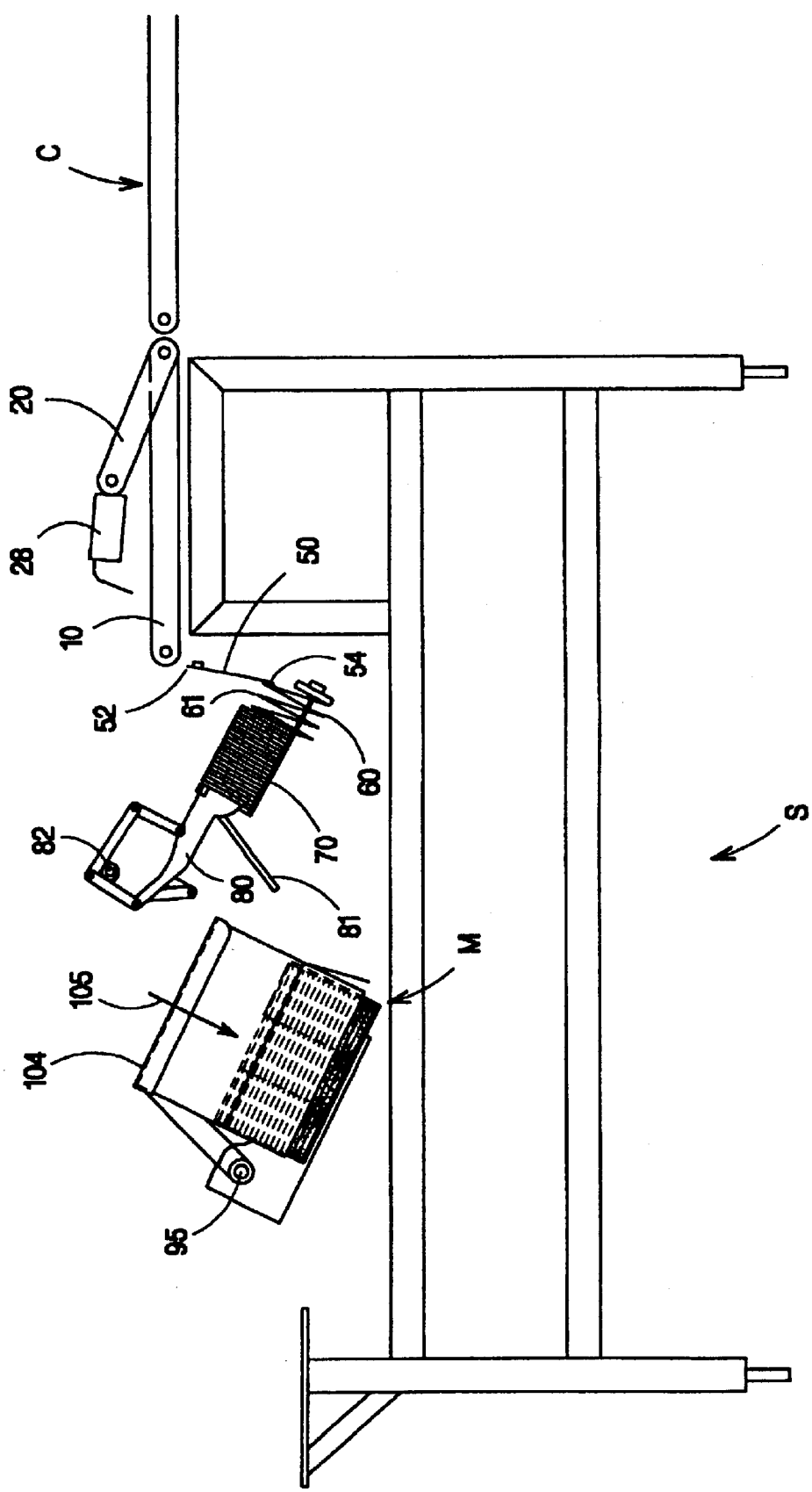
FIG. 5 is a side elevational view showing the case rollover mechanism rotated to enclose the fully loaded matrix former within an empty case.
Figure 6:
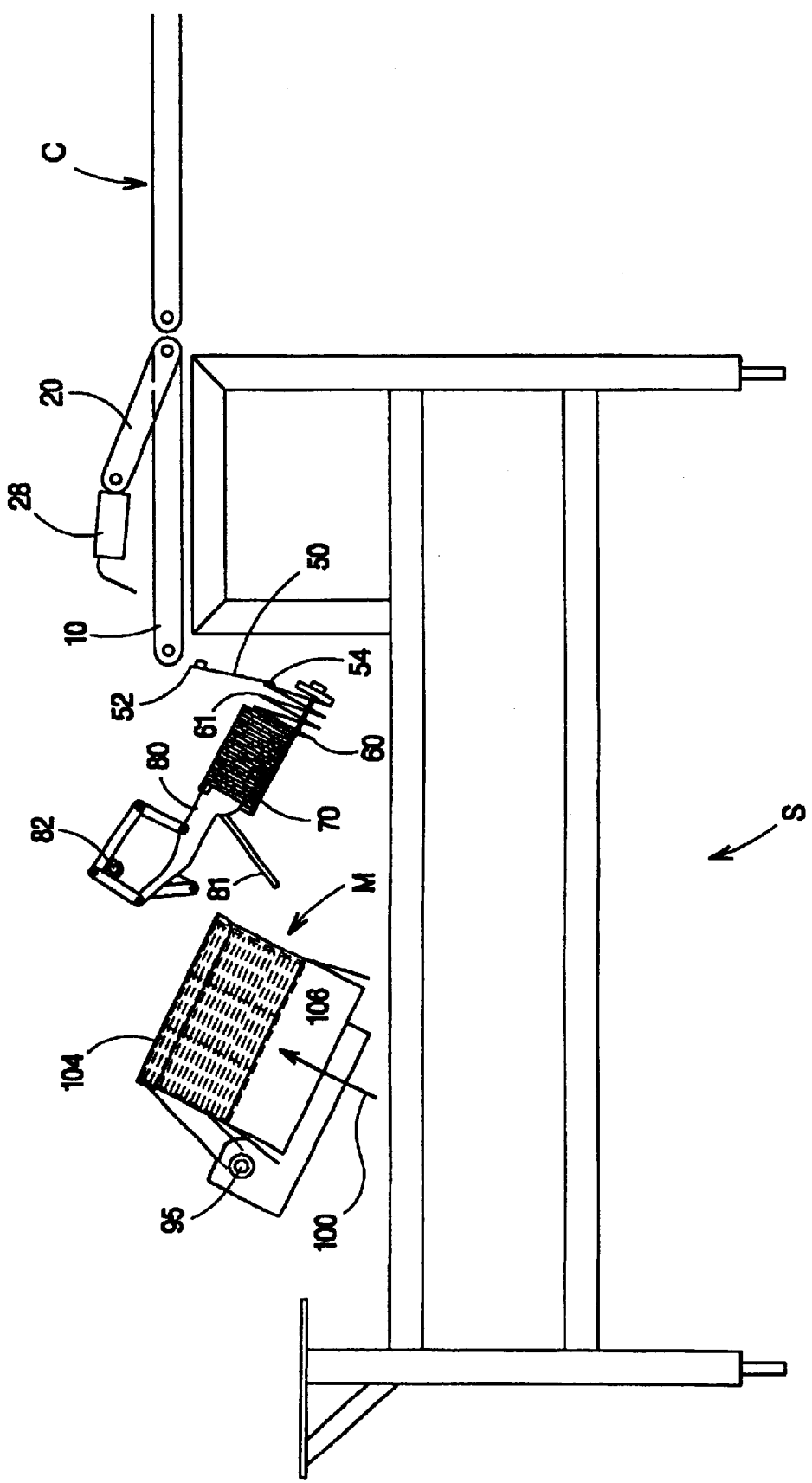
FIG. 6 is a side elevational view showing the matrix former being lifted into the case rollover mechanism.
Figure 7:
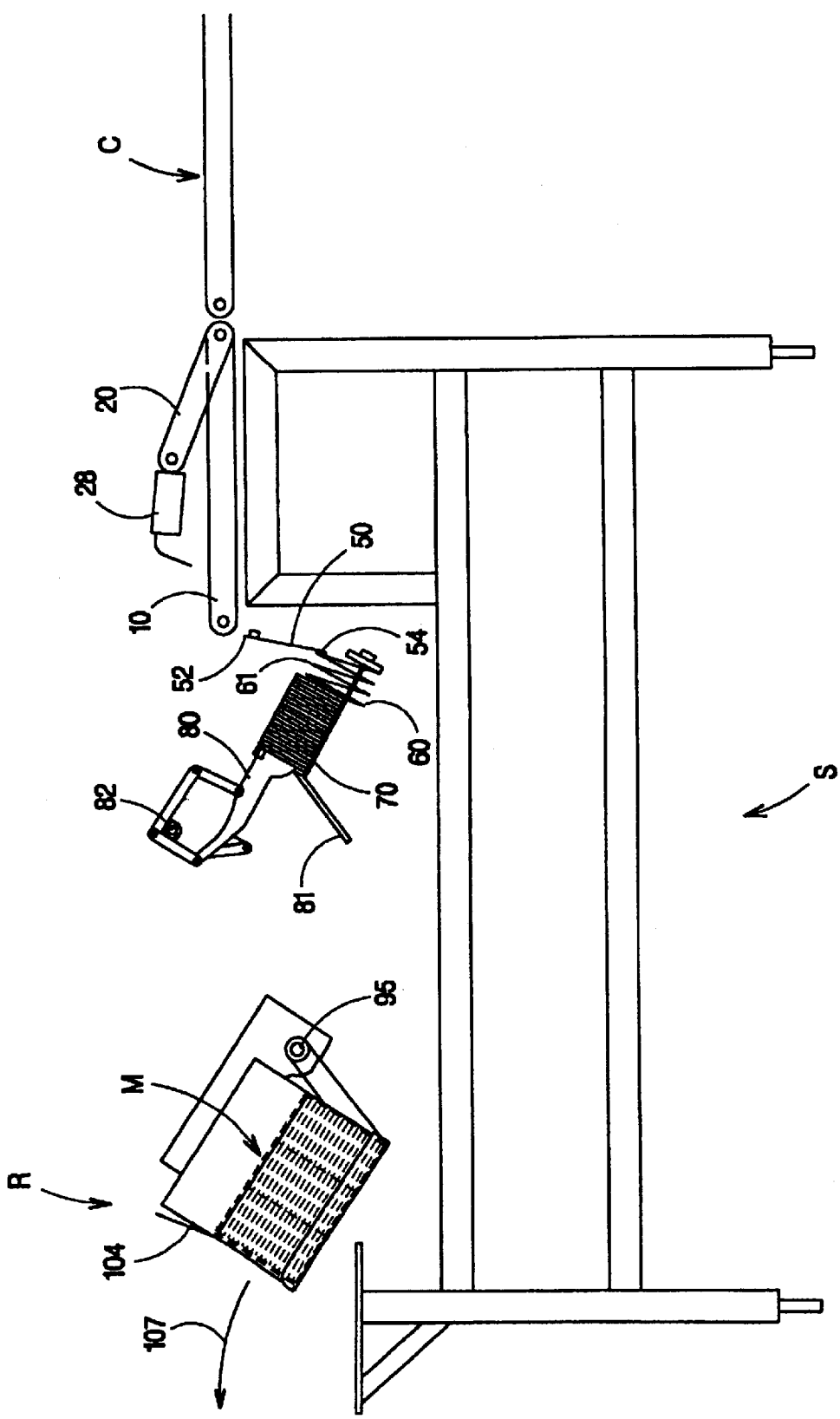
FIG. 7 is side elevational view showing the matrix former and case rollover rotated to the initial load position of the case rollover mechanism.

With specific reference to FIG. 5, the carton 104 pivots about a common axis 95, so that the open carton 104 is placed on top on matrix former M, rotating approximately 180° to matrix former M in the direction of arrow 105. The matrix former M is then raised and inserted into the carton 104 in the direction of arrow 106, as shown in FIG. 6. After the matrix former M is raised into carton 104, the matrix former M and the carton 104 are pivoted about shaft 95 again 180° back to the initial load position of the case rollover mechanism R, as illustrated in FIG. 7.

With reference now to FIG. 8, the matrix former M is retracted from the carton 104 with a vertical motion, and then pivoted about axis 95 back into position to receive stacks from the transfer heads 80. An operator removes the filled carton 104, and places it on the exit conveyor E. An empty carton 104 is then placed into the case rollover mechanism R, and the process described above repeated.

Figure 9:
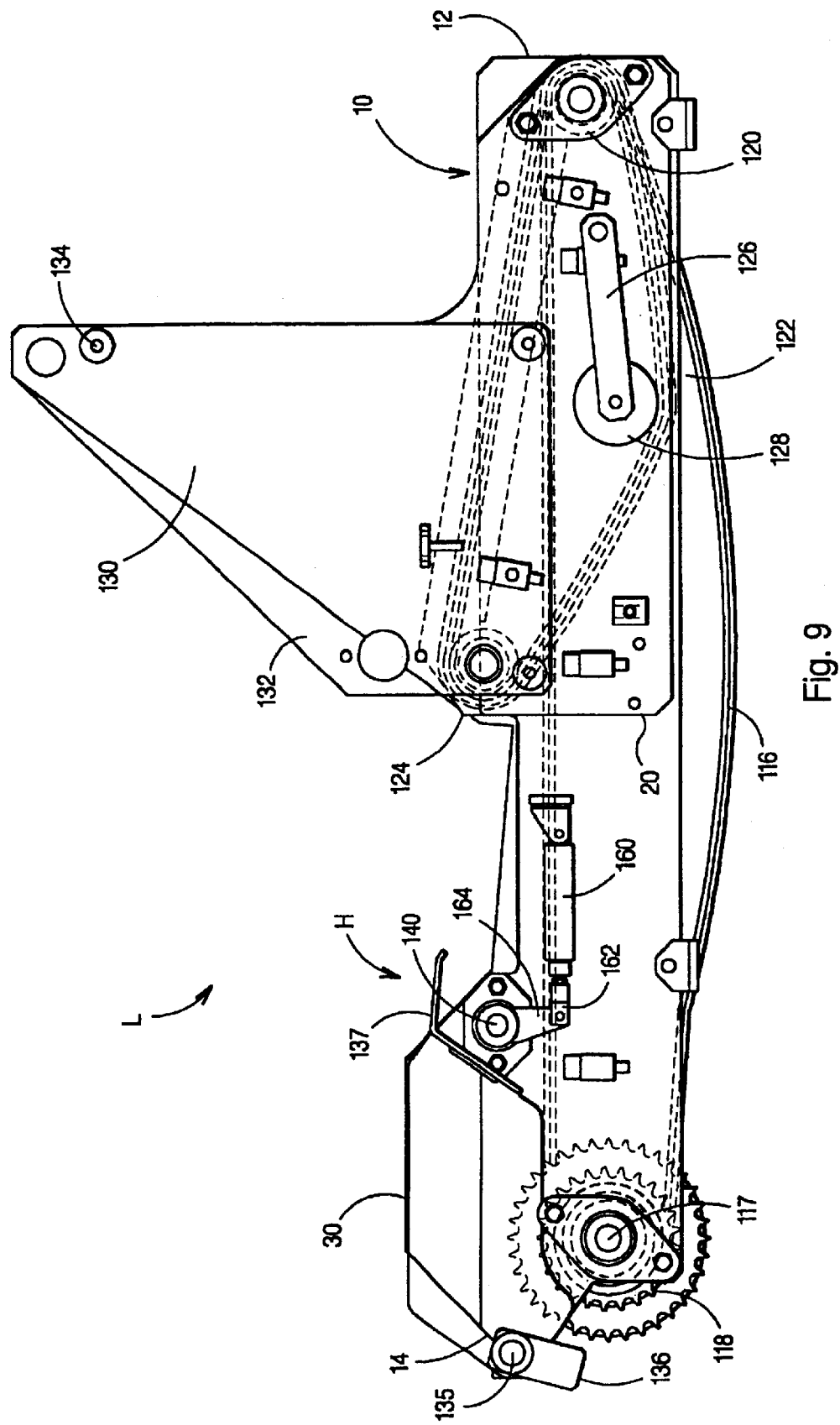
FIG. 9 is a side elevational view with portions shown in phantom of the lane combining conveyor system.

As earlier described, the product P enters first conveyor 10 at its entrance end 12, and exits at an exit end 14. Conveyor 10 preferably includes belt 116 moving in a counter clockwise direction, as best shown in FIG. 9. Belt 116 rotates about sprockets 118 and 120. Similarly, second elevating conveyor 20 includes a chain belt 122, which rotates in a counterclockwise direction about sprocket 120 and sprocket 124. Conveyor 20 also includes a bell crank 126, with a roller 128 attached to its distal end, which operates as take-up for chain belt 122 of elevating conveyor 20. Right side plate 130 and left side plate 132 provide support for pushers 40, as best shown in FIG. 11. Plates 130 and 132 are connected by shaft 134, and are preferably made of stainless steel.

Preferably disposed at the exit end of first conveyor 10 are dividers 30, as best shown in FIG. 9. Dividers 30 extend to the height of cross feed conveyor 28. Dividers 30 are connected to cross shaft 135, so that the dividers 30 may be rigidly lifted and pivoted about shaft 135 for cleaning. A link 136 is secured to shaft 135 and acts as a stop for dividers 30 when they are pivoted for cleaning. Secured between dividers 30 is sheet 137 which slopes downwardly from cross feed conveyor 28. Product P accumulated on crossfeed conveyor 28 is advanced to first conveyor 10 via sheet 137. Sheet 137 also extends along the top of cross feed conveyor 28.

After the appropriate number of products P have accumulated on the cross feed conveyor 28, the product P being conveyed along the first conveyor 10 must be stopped, to allow the necessary space on the first conveyor 10 for the product P transferred from the cross feed conveyor 28. Hold back mechanism H, as best shown in FIGS. 9–10, includes a rotatable shaft 140 with a plurality of fingers 142 rigidly attached at spaced locations. Preferably, there is one finger 142 associated with each lane, to prevent product P on the first conveyor 10 from being further advanced when the fingers 142 are lowered into position. In the preferred embodiment, there are five fingers 142. However, it should be understood that there may be multiple fingers disposed in each lane with various configurations, which limit movement of the product on first conveyor 10 beyond the cross feed conveyor 28.

With reference in particular to FIG. 10, fingers 142 are illustrated in their inoperative raised position, with the fingers 142 being parallel to the plane of first conveyor 10. In their operative position, fingers 142 are rotated towards conveyor 10. The fingers 142 are thus perpendicular to the plane of first conveyor 10, thereby obstructing a lane to prevent product from advancing there beyond beneath cross feed conveyor 28. This causes product P to continue to be advanced by conveyor 10 up to fingers 142, thus permitting product P in the lanes to be tightly packed. Fingers 142 are sized so that they are spaced from first conveyor 10 but disposed to intercept product P, and are preferably made of plastic as to not damage first conveyor 10.

The hold back mechanism H is side supported on plates 144 and 146, which also provide support for first set of dividers 16. Each divider 16 is secured by a plurality of cross bars 150, 152, and 154. Cross bars 150, 152, and 154 are disposed perpendicular to each divider 16 and are spaced along the dividers 16. Preferably, the dividers 16 and cross bars 150, 152, and 154 are made of stainless steel, as is rotatable shaft 140. Cross bars 150 and 152 are side supported on plates 144 and 146.

With reference to FIG. 9, rotatable shaft 140 is rotated by cylinder and piston assembly 160. Cylinder and piston assembly includes a clevis 162 attached to bell crank 164. With reference to FIGS. 9 and 10, bell crank 164 fits in a milled key 166 of rotatable shaft 140. As the cylinder piston 160 is extended, bell crank 164 rotates in a clockwise direction, thus rotating rotatable shaft 140 and fingers 142 towards first conveyor 10. Cylinder and assembly 160 operates in response to a signal received from controller 34 that the appropriate number of product P has been accumulated on the cross feed conveyor 28.

Cross feed conveyor 28 advances product P in cross machine direction 32 from its proximal end 170 to distal end 172 in the direction of arrow 174. The cross feed conveyor 28 includes a fence 44, which prevents the product P accumulated on the cross feed conveyor 28 from proceeding beyond that point. Cross feed conveyor 28 includes a belt which is advanced on sprockets 176. Cross feed conveyor 28 is driven by a gear drive 180 which rotates the drive shaft 182.

To assist in direction change of product P as it is reoriented from the second conveyor 20 to the cross feed conveyor 28, a driver wheel 175 is provided. With reference to FIG. 11, the driver wheel 175 is a spiked wheel, and rotates in cross machine direction 174. The driver wheel 175 engages the product P as it is being received on cross feed conveyor 28, and re-orients the product from the machine direction 11 to the cross machine direction 174.

Once the predetermined supply of product P is disposed on cross feed conveyor 28, as described above, then the hold back mechanism H is operated to prevent the product P on the lower conveyor 10 from advancing beyond cross feed conveyor 28. After the hold back mechanism H is operated, pushers 40 are operated and move forward in machine direction 11. The pushers 40 are supported by shaft 170, which is secured to frame plates 130 and 132. The pushers 40 operate through clutch 184, which preferably is powered by an electric coil. In the preferred embodiment, clutch 184 is a single revolution clutch, 180° of its revolution functioning to advance pushers 40 forward in the machine direction, and the latter 180° moving the pushers 40 back to their initial position. Clutch 184 is driven by sprocket 190 which rotates shaft 191, thereby pivoting bell crank 192. Bell crank 192 is pivotally secured to cross link 194, which causes links 196, 197, 198, and 199 to move crossbar 200 parallel to the plane of crossfeed conveyor 28. Cross bar 200 is secured to pushers 40 by brackets 201 and 202.

In the preferred embodiment, pushers 40 include a plate 203 with a plurality of elongated finger-like shaft members 204 extending from a lower surface. Preferably, there are two fingers associated with each product P that is to be transferred from cross feed conveyor 28. However, it should be understood that any number of pushers of differing construction and configuration may operate to effectively remove the product from the cross feed conveyor 28. In addition, one skilled in the art would recognize that there are numerous structures that may be contemplated to remove the product P from cross feed conveyor 28, and that this invention is not limited to the structure described above.

As the product P travels down pivotal sheets 50 from entry portions 52 to exit portions 54, it is stacked in consecutive flights of coil stacker 60. Pivotal sheets 50 are pivotally secured at each entry portion 52 at pivot point 250.

Preferably, each sheet is dimpled, having an undulating surface which provides consistent friction between the product P and sheets 50. In addition, the sheets 50 may be curved at exit portion 54, providing for a better entry into coil stacker 60.

Disposed at the center of each coil 61 is a product support 251. Product support 251 extends the length of coils 61 to provide support for the product P as it is positioned in turns of the coils 61. The support 251 includes two opposite disposed sloping surfaces which form a triangular-like surface on which the product is supported.

A cam 252 is operably associated with pivotal sheets 50, so that rotation of cam 252 pivots the sheets 50 about its pivot point 250 in synchronization with the flights of coils 61. Cam 252 rotates in a counterclockwise direction, and is driven in synchronization with gear drive 254. Gear drive 254 also drive coil stackers 60. With reference to FIG. 13, there is a gear drive 254 associated with each coil-type stacker 60. In the preferred embodiment, there are five gear drives 254, one for each of the coil-type stackers 60. The gear drives 254 are powered by a main drive shaft 260.

In order to keep the product P properly aligned while sliding down pivotal sheets 50, a plurality of dividers 64(*a*)–(*f*) are provided. The dividers 64 extend above entry portions 52 of sheets 50 and beyond exit portions 54 of sheets 50, in order to ensure that products P do not cross into other lanes during the stacking operation. As the product moves down pivotal sheets 50, the cam 252 pivots the sheets 50 in the direction of the flights of the coils 61. Preferably, pivotal sheets 50 move with the flights of the coils 61 during 270° of the cam rotation. Pivotal sheets 50 retract towards coils 61 during the last 90° of cam rotation. This operation is timed, so that pivotal sheets 50 are aligned ¾ of the time with the flight or the turns of coil type stackers 60, increasing the chances that product P will be properly positioned between the turns of the coil 61.

Disposed between each adjacent divider 64 is a guard 256, as best shown in FIG. 12. Guards 256 are of rectangular construction, and extend between and are secured to an adjacent divider 64. Guards 256 are made of steel, but may be of any other durable material. Guards 256, because they extend along dividers 64, help insure that product P stays in contact with sheet 50. Preferably, guards 256 are angled so as to funnel the product P towards sheets 50.

Stack formers F may be adjusted to alter the number of lanes to be stacked in order to accommodate product P of different sizes. For instance, if the number of lanes conveyed by the first conveyor 10 is to be reduced from five to four, the lanes of stack former F can also be reduced to four lanes. With reference to FIGS. 13 and 14, there is an upper joint assembly U and a lower joint assembly L for adjusting coils 61. The upper joint assembly U is disposed at the pivotal point of sheets 50, while the lower joint assembly L is associated with the coils 61. Each divider 64(*a*)–(*f*) is secured to an outer shaft 300, which is supported on inner shaft 301. One of the end dividers 64(*a*) is rigidly secured to bar 302. Bar 302 is translated by way of lead screw 303. In order to decrease the number of dividers 64, bar 302 is translated away from the dividers 64. Movement of bar 302 causes divider 64(*a*) also to be moved.

With reference now to FIGS. 14 and 14(*a*), each sheet 50 is secured to a split block 304. Disposed within each split block 304 are cooperating flanged shafts 305 and 306 which are rigidly attached to outer shafts 300(*a*) and 300(*b*). As bar 302 is translated away from dividers 64*a*–*f*, divider 64(*a*) is also moved until the flange of shaft 305 abuts the inner wall 307 of split block 304. The split block 304, with bar 302, and divider 64(*a*) move in synchronization, as one body. Bar 302 continues to advance divider 64(*a*) and split block 304 until the shaft 306 is adjacent to the inner wall 308 of split block 304, causing the divider 64(*b*) also to be moved in synchronization.

Each sheet SO has a structure identical to that described in FIG. 14(*a*). Thus, the process is continued until the dividers 64 are adequately positioned as desired. With reference now to FIGS. 13 and 13(*a*), the coil stackers 60 are adjusted by an inner joint assembly L. Each divider 64 is rigidly secured to a bearing block 309, which secures coil supports 310(*a*) and 310(*b*). The lower joint assembly L and the upper joint assembly U are moved in alignment.

Bar 302 advances divider 64(*a*) until the coil support 310(*a*) abuts the inner wall 311(*a*) of bearing block 309(*a*), causing coil stacker 60 to be advanced in synchronization as one body with divider 64(*a*) and bar 302. Coil stackers 60 continue to move until coil support 310(*b*) abuts an inner wall 311(*b*) of coil stackers 60, causing divider 64(*b*) to advance as one body with coil 61, divider 64(*a*), and bar 302. Each coil has an identical structure of that described in FIG. 13(*a*) thus, the process is continued until dividers 64 are positioned as desired.

Figure 15:
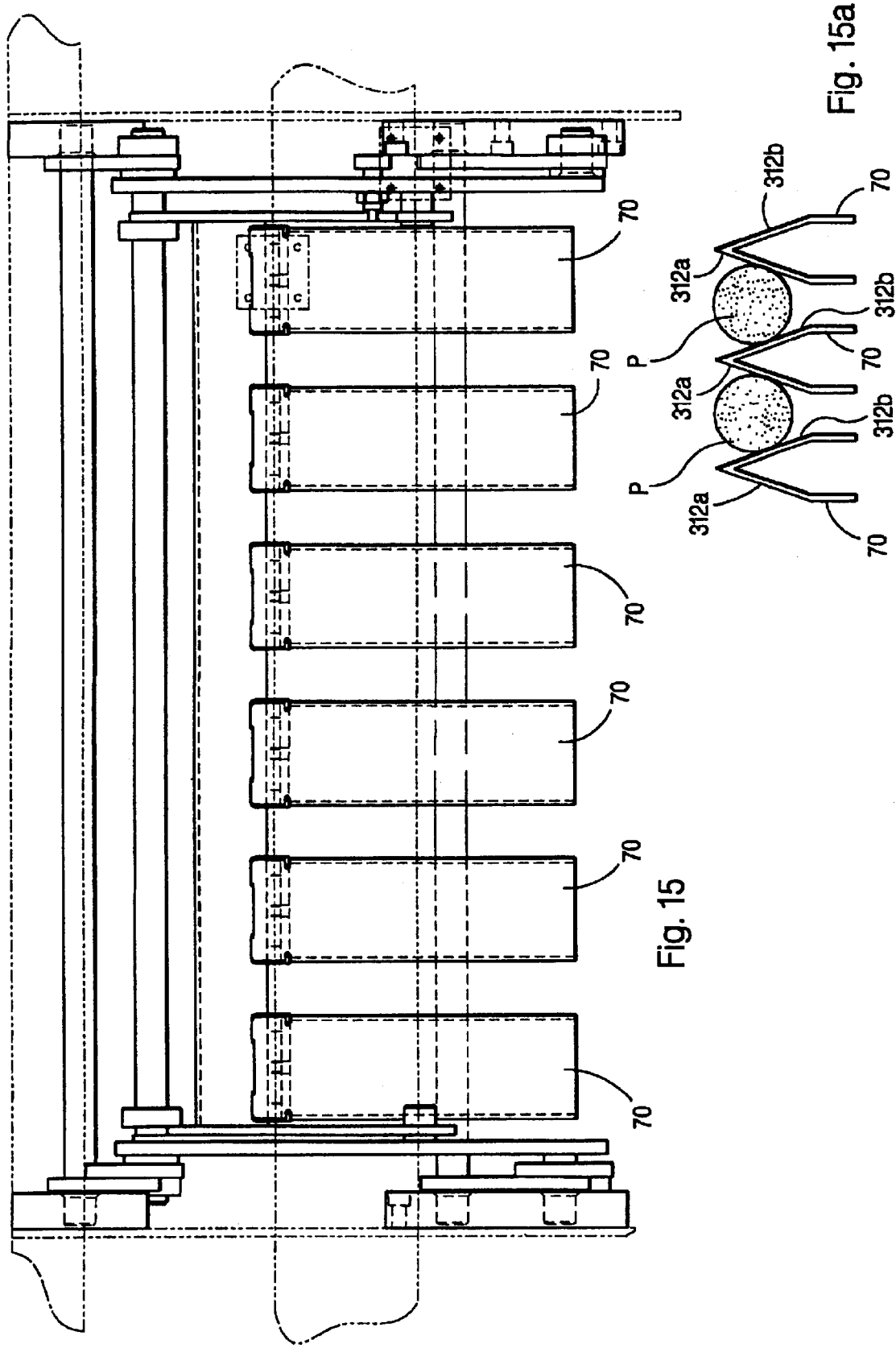
FIG. 15 is a plan view with portions shown in phantom of the stacking rails.

There are two rails 70 associated with each coil stacker 60. The rails 70 provide support for the product being arranged into stacks by the stackers 60. In the preferred embodiment, there are six rails 70 provided for five coil-type stackers 60. Preferably, each rail is triangular in shape, having a roof-like configuration, and is shared by adjacent coils 61, as illustrated in FIG. 15(*a*). In particular, each rail 70 has first and second sloping top surfaces 312(*a*) and 312(*b*), the sloping surfaces of adjacent rails 70 providing support for product P being oriented into stacks by coils 61. That is, surface 312(*b*) of am rail 70 together with opposing surface 312(*a*) of adjacent rail 70, form a triangular-like receptacle which supports a stack of product P. Preferably, the rails 70 are disposed at a 30 incline from horizontal. This ensures that product P stacks in a uniform fashion.

Figure 16:
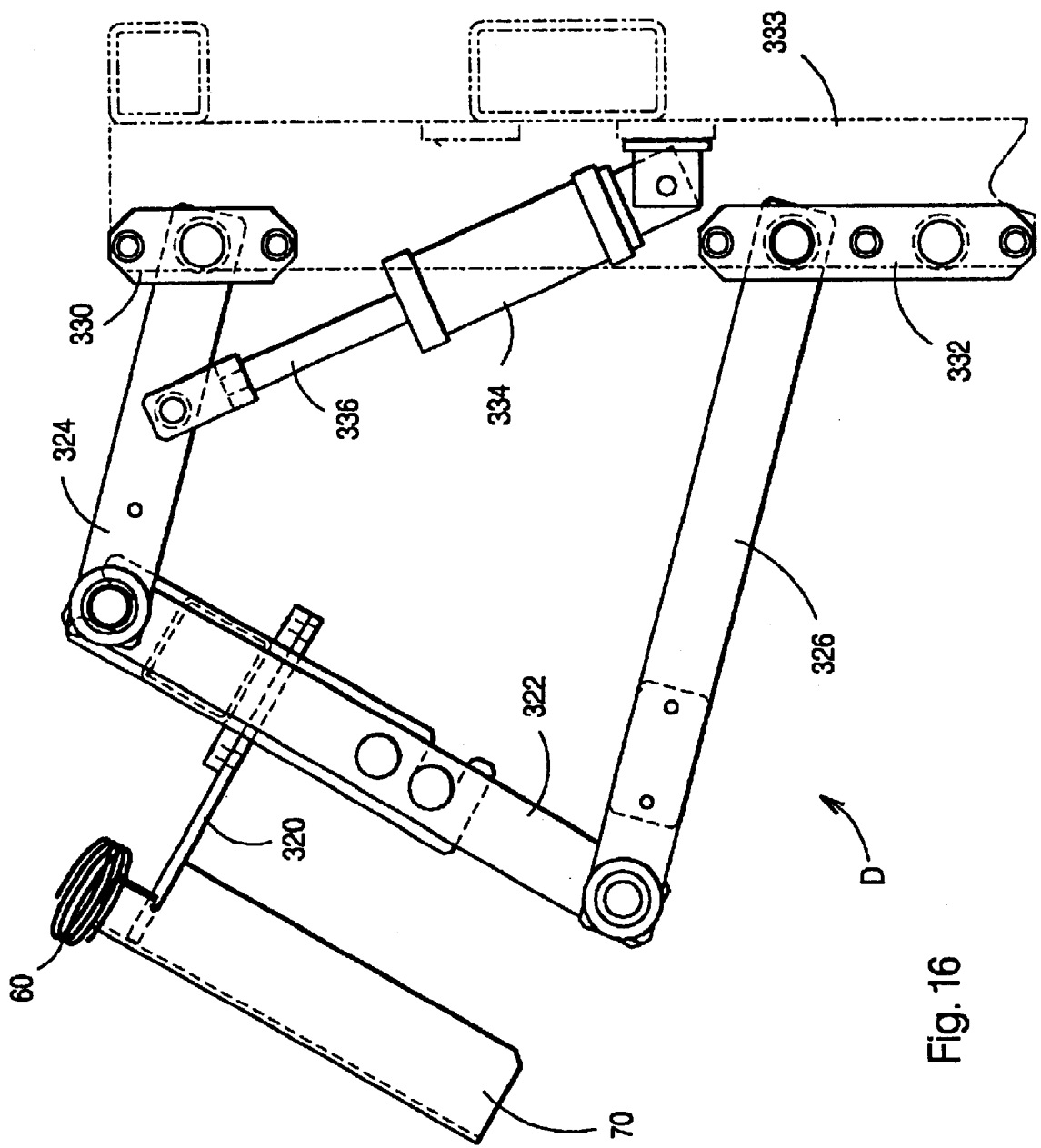
FIG. 16 is a side elevational view with portions shown in phantom of the eject

Rails 70 may be pivoted downwardly from the coil-type stackers 60 to release jammed product P. Each rail 70 is secured to a bar 320, as best shown in FIG. 16. Each bar 320 in turn is secured to a link 322. Link 322 is secured at its ends to links 324 and 326. Link 324 is secured to a bearing 330, while link 326 is secured to a bearing 332, bearings 330 and 332 both secured to Frame 333. Link 324 is shorter in length than link 326. An air cylinder 334 is provided for pivoting the rails 70 away from the coils. In operation, when piston rod 336 of air cylinder 334 is retracted, the links 322, 324, and 326 cause the rails 70 to rotate down and away from stacking coils 60. This causes product which is jammed between stacking coils 60 and rails 70 to be released to a container located beneath the stacking coils 60.

Figures 17A, 17B:
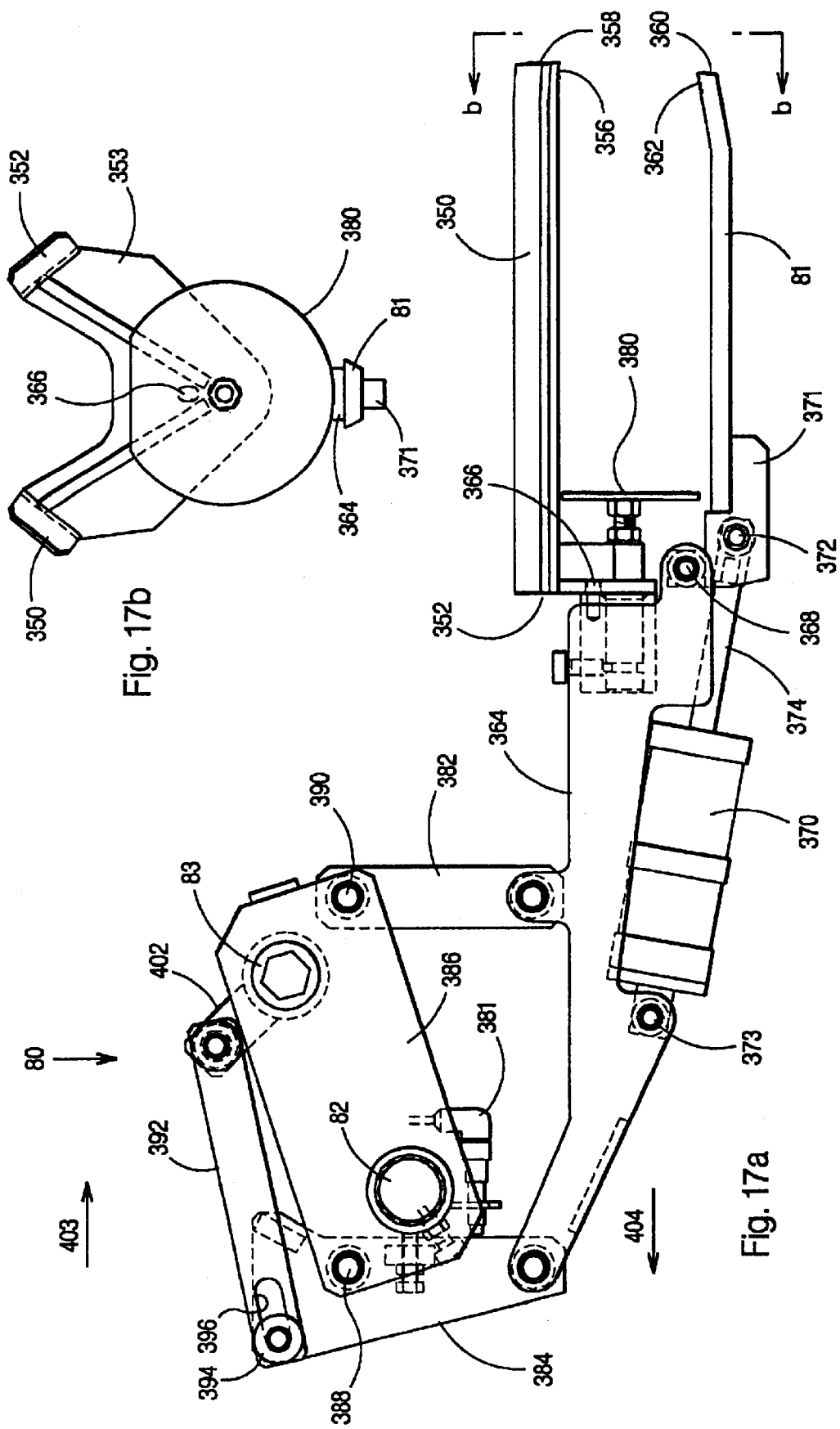
FIG. 17(a) is a side elevational view with portions shown in phantom of a transfer.
FIG. 17(b) is an elevational view with portions shown in phantom of a transfer head.

A transfer head 80 is associated with each stack as it is being formed and supported on adjacently disposed rails 70. Transfer heads 80 include three jaws, two stationary jaws 350 and 352, a movable jaw 81, as best shown in FIG. 17. Stationary jaws 350 and 352 are integrally formed, and include a back support 353. Distal end 356 of stationary jaw 350 and distal end 358 of stationary jaw 352 are tapered. Distal end 360 of movable jaw 81 is tapered inwardly and includes ridges 362 along its inside surface, to better grip the stack. Distal ends 356 and 358 may also include ridges which aid in gripping the stack.

Transfer heads 80 also include a main frame support 364 to which stationary jaws 350 and 352 and movable jaw 81 are secured. Stationary jaw 352 and 350 are secured to frame support 364 by pin 366, while movable jaw 81 is pivotally attached to support frame 364 by pin 368. Movable jaw 81 is secured so that it is capable of pivoting about pin 3-68. Movable jaw 81 is attached to air cylinder 370 by way of jaw support 371, which is secured by pin 372. Air cylinder 370 is also connected at its other end to support frame 364 by pin 373. As piston rod 374 of air cylinder 370 retracts, movable jaw 81 pivots clockwise about pin 368.

Each transfer head 80 includes a stop 380. Preferably, stop 380 is circular but may be any shape. Stop 380 determines when sufficient product P has been stacked onto the rails 70. The transfer heads 80 move away from the stack when the product P is pushed against the stop 380. When a full stack of product P is formed by the associated coil 61, the end of the stack contacts stop 380 which is located in the back of transfer head 80. This forces the transfer head 80 away from coil type stacker 60. This movement opens a proximity switch 381, signaling the movable jaw 81 on transfer head 80 to close. Additional product P can continue to exit the end of the coil type stacker 60, but will not be included in the gripped stack, since the gripped stack is elevated upwardly when movable jaw 81 is closed. When all movable jaws 81 have closed, transfer heads 80 are retracted and then pivoted into the matrix former M.

Because of switch 381, the number of product P in a stack can be adjusted in order to accommodate the total weight or number of products to be included in carton 104. An additional patty can be added to each stack by allowing the stacking coil 61 to rotate an additional turn after the signal to close the movable jaw 81 is received. This allows the total count of patties in a case to be varied to adjust the total weight of the case.

In order to retract transfer heads 80 away from the coils 61, the transfer heads 80 are mounted on a four bar linkage. Support frame 364 is attached to links 382 and 384. Links 382 and 384 are also both attached to link 386. Link 384 is attached to link 386 by pin 388, while link 382 is attached to link 386 by pin 390. Link 384 is slidingly secured to link 392 by way of pin 394 within a slot 396. Link 392 is attached to bell crank 400, which rotates on horizontal shaft 83. In operation, the motion of the four bar linkage functions to close movable jaw 81, and also operates to retract transfer heads 80 away from coils.

After all piston rods 374 of air cylinders 370 are extended to close movable jaws 81, bell crank 400 is rotated clockwise. As bell crank 400 rotates clockwise, link 392 is advanced to the right in the direction of arrow 403, causing link 384 to rotate about pin 388, while the support frame 364 is moved to the left, in the direction of arrow 404. Thus, the support fra~ne 364 and transfer heads 80 are retracted beneath shaft 82, thereby reducing the radius by which the transfer heads 80 are rotated. Transfer heads 80 are all connected by a common shaft 82 which pivots transfer heads 80 approximately 270° to the matrix former M.

Matrix former M is a three-sided open receptacle with a base portion 410, a side portion 412, a back side portion 414, and another side portion 416. The base portion 410 is divided into three sections 418, 420, and 422. Likewise the back side portion 414 is divided into three section 424, 426, and 428. Matrix former M is positioned in the loading system S such that the back side portion 414 is adjacent to the stack transfer mechanism T. The stacks will be transferred in the direction of the arrow 430, which also represents the machine direction.

Preferably, the matrix former M is disposed at a 30° angle, such that when stacks are dispensed into matrix former M, the stacks will rest against the back side portion 414. Matrix former M is designed so that it can move inwardly as represented by arrow 432 of FIG. 19. This permits the matrix former M to receive more than one row of stacks. In addition, matrix former M can move upwardly with respect to the transfer heads 80, as represented by arrow 434. Before the transfer heads 80 are rotated 270° from the stack formers F into the matrix former M, as illustrated in FIG. 3, the matrix former M is lifted up to the transfer head 80. In order to remove the stack from the transfer heads G without scrambling of the stack, a stack stripper is engaged.

Figure 18A:
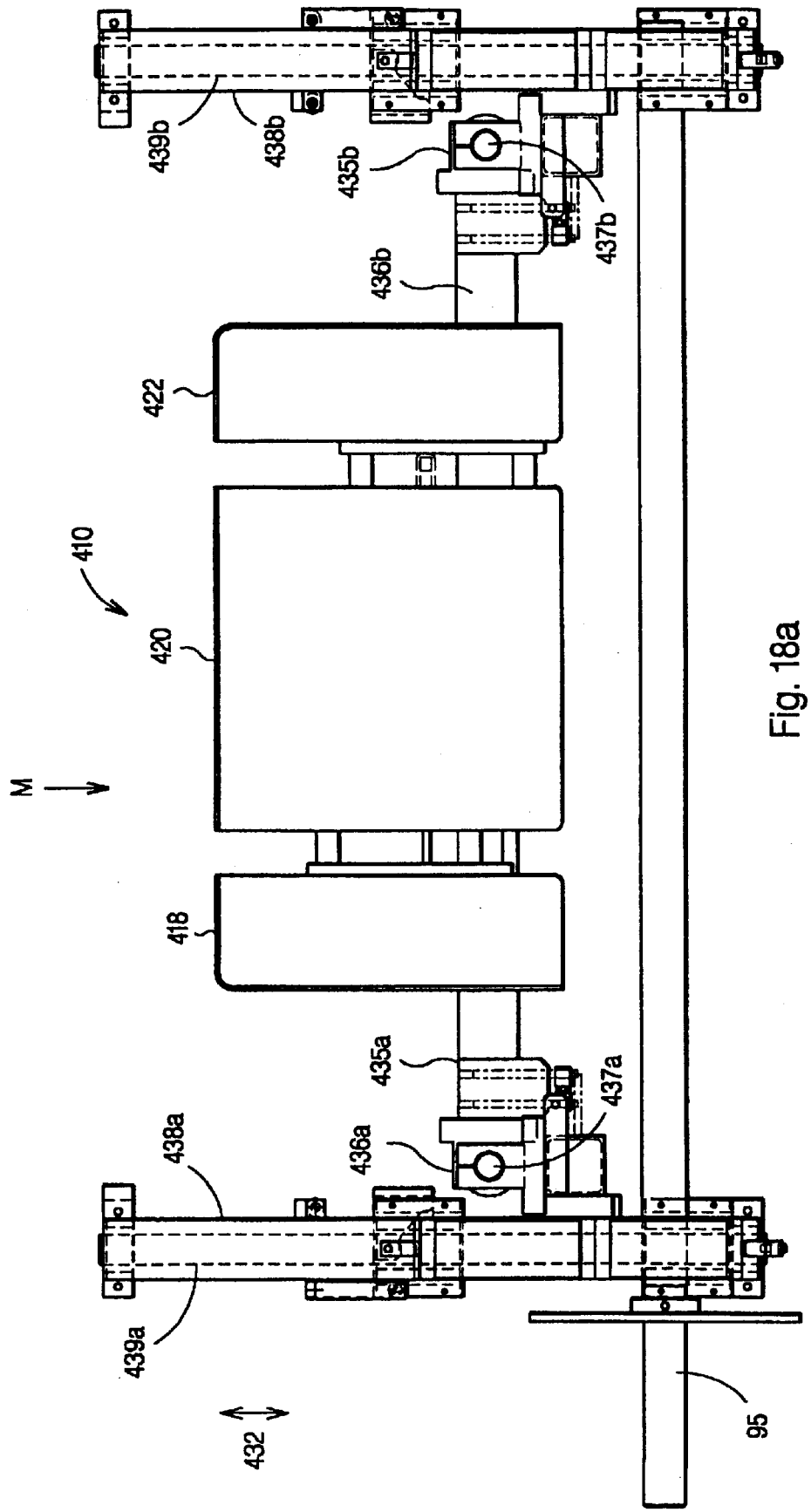
FIG. 18(a) is a top plan view with portions shown in phantom of a matrix former.

With specific reference to FIG. 18(a), matrix former M includes support members 435(a) and 435(b) extending from base sections 418 and 422 respectively. Support members 435(a) and 435(b) are secured to respective tubular arms 436(a) and 436(b). Disposed within tubular arms 436(a) and 436(b) are shafts 437(a) and 437(b), which telescope to permit axial movement of matrix former M. Likewise, support members 435(a) and 435(b) are secured to tubular members 438(a) and 438(b), which include shafts 439(a) and 439(b) disposed within, and which telescope to permit lateral movement of matrix former M. Support members 435(a) and 435(b) are secured to shaft 95 about which the matrix former M is rotated to the case rollover mechanism R. Shaft 95 is powered by an electric motor.

Figure 20A:
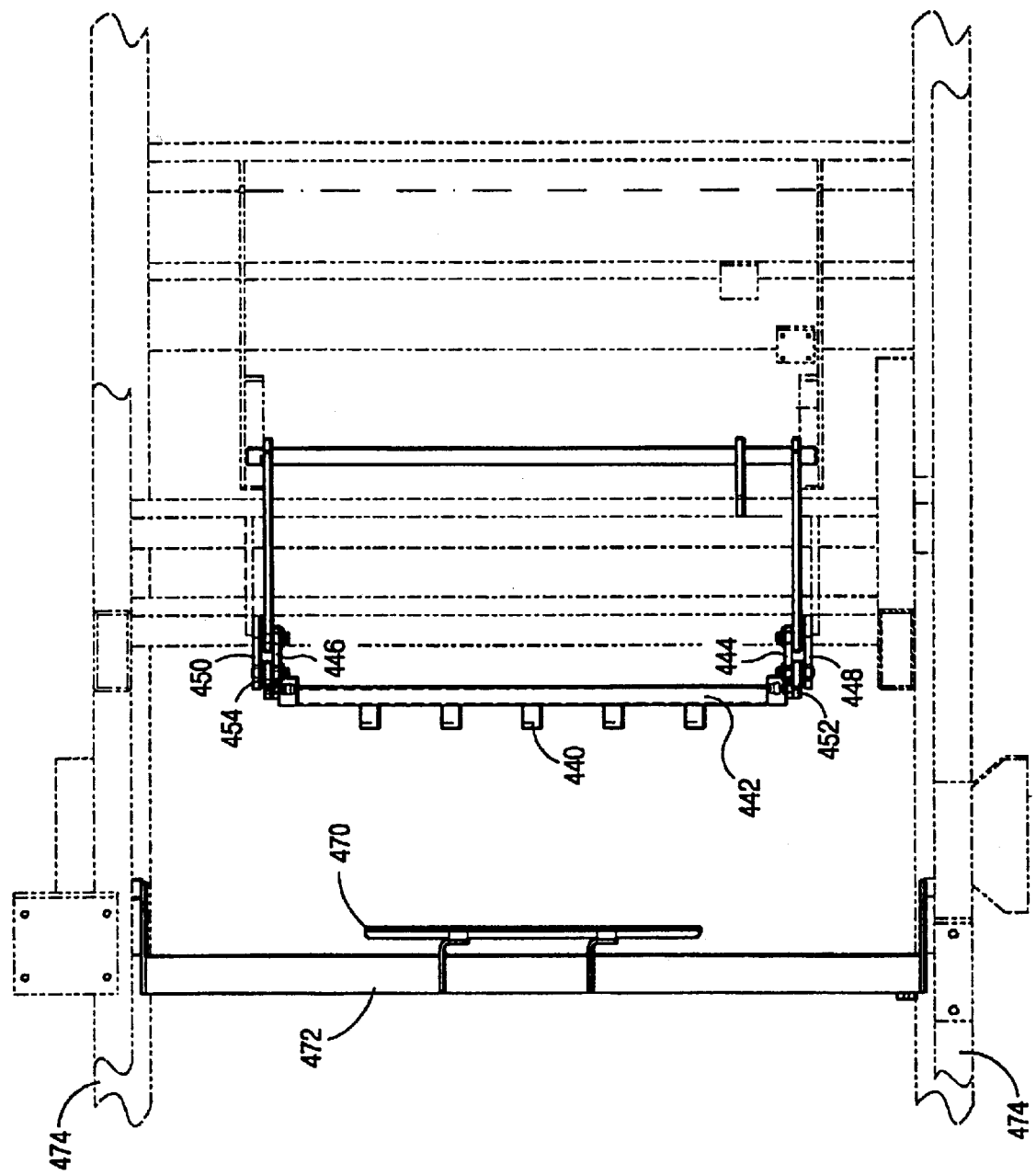
FIG. 20(a) is a plan view with portions shown in phantom of the stack strippers of the invention.
Figure 20B:
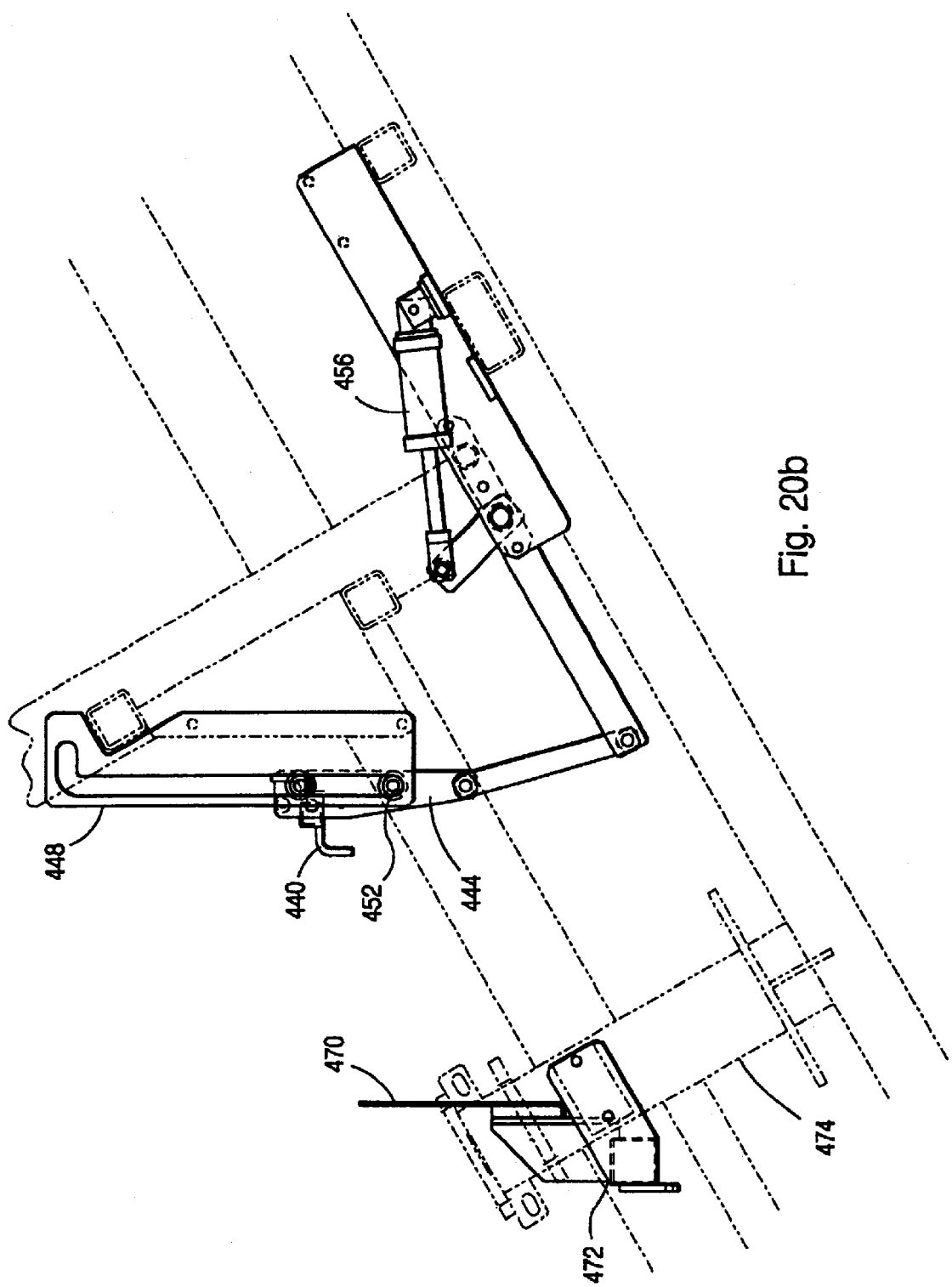
FIG. 20(b) is a side elevational view with portions shown in phantom of the strippers.

With reference now to FIGS. 20(a) and 20(b), the stack stripper includes a plurality of stripper fingers 440. The stripper fingers 440 are equally spaced so that when they are operated, a stripper finger 440 will engage the top of each stack of product P being transferred to the of stationary jaw 352 are tapered. Distal end 360 of movable jaw 81 is tapered inwardly and includes ridges 362 along its inside surface, to better grip the stack. Distal ends 356 and 358 may also include ridges which aid in gripping the stack.

Transfer heads 80 also include a main frame support 364 to which stationary jaws 350 and 352 and movable jaw 81 are secured. Stationary jaw 352 and 350 are secured to frame support 364 by pin 366, while movable jaw 81 is pivotally attached to support frame 364 by pin 368. Movable jaw 81 is secured so that it is capable of pivoting about pin 3-68. Movable jaw 81 is attached to air cylinder 370 by way of jaw support 371, which is secured by pin 372. Air cylinder 370 is also connected at its other end to support frame 364 by pin 373. As piston rod 374 of air cylinder 370 retracts, movable jaw 81 pivots clockwise about pin 368.

Each transfer head 80 includes a stop 380. Preferably, stop 380 is circular but may be any shape. Stop 380 determines when sufficient product P has been stacked onto the rails 70. The transfer heads 80 move away from the stack when the product P is pushed against the stop 380. When a full stack of product P is formed by the associated coil 61, the end of the stack contacts stop 380 which is located in the back of transfer head 80. This forces the transfer head 80 away from coil type stacker 60. This movement opens a proximity switch 381, signaling the movable jaw 81 on transfer head 80 to close. Additional product P can continue to exit the end of the coil type stacker 60, but will not be included in the gripped stack, since the gripped stack is elevated upwardly when movable jaw 81 is closed. When all movable jaws 81 have closed, transfer heads 80 are retracted and then pivoted into the matrix former M.

Because of switch 381, the number of product P in a stack can be adjusted in order to accommodate the total weight or number of products to be included in carton 104. An additional patty can be added to each stack by allowing the stacking coil 61 to rotate an additional turn after the signal to close the movable jaw 81 is received. This allows the total count of patties in a case to be varied to adjust the total weight of the case.

In order to retract transfer heads 80 away from the coils 61, the transfer heads 80 are mounted on a four bar linkage. Support frame 364 is attached to links 382 and 384. Links 382 and 384 are also both attached to link 386. Link 384 is attached to link 386 by pin 388, while link 382 is attached to link 386 by pin 390. Link 384 is slidingly secured to link 392 by way of pin 394 within a slot 396. Link 392 is attached to bell crank 400, which rotates on horizontal shaft 83. In operation, the motion of the four bar linkage functions to close movable jaw 81, and also operates to retract transfer heads 80 away from coils.

After all piston rods 374 of air cylinders 370 are extended to close movable jaws 81, bell crank 400 is rotated clockwise. As bell crank 400 rotates clockwise, link 392 is advanced to the right in the direction of arrow 403, causing link 384 to rotate about pin 388, while the support frame 364 is moved to the left, in the direction of arrow 404. Thus, the support fra~ne 364 and transfer heads 80 are retracted beneath shaft 82, thereby reducing the radius by which the transfer heads 80 are rotated. Transfer heads 80 are all connected by a common shaft 82 which pivots transfer heads 80 approximately 270° to the matrix former M.

Matrix former M is a three-sided open receptacle with a base portion 410, a side portion 412, a back side portion 414, and another side portion 416. The base portion 410 is divided into three sections 418, 420, and 422. Likewise the back side portion 414 is divided into three section 424, 426, and 428. Matrix former M is positioned in the loading system S such that the back side portion 414 is adjacent to the stack transfer mechanism T. The stacks will be transferred in the direction of the arrow 430, which also represents the machine direction.

Preferably, the matrix former M is disposed at a 30° angle, such that when stacks are dispensed into matrix former M, the stacks will rest against the back side portion 414. Matrix former M is designed so that it can move inwardly as represented by arrow 432 of FIG. 19. This permits the matrix former M to receive more than one row of stacks. In addition, matrix former M can move upwardly with respect to the transfer heads 80, as represented by arrow 434. Before the transfer heads 80 are rotated 270 from the stack formers F into the matrix former M, as illustrated in FIG. 3, the matrix former M is lifted up to the transfer head 80. In order to remove the stack from the transfer heads G without scrambling of the stack, a stack stripper is engaged.

With specific reference to FIG. 18(a), matrix former M includes support members 435(a) and 435(b) extending from base sections 418 and 422 respectively. Support members 435(a) and 435(b) are secured to respective tubular arms 436(a) and 436(b). Disposed within tubular arms 436(a) and 436(b) are shafts 437(a) and 437(b), which telescope to permit axial movement of matrix former M. Likewise, support members 435(a) and 435(b) are secured to tubular members 438(a) and 438(b), which include shafts 439(a) and 439(b) disposed within, and which telescope to permit lateral movement of matrix former M. Support members 435(a) and 435(b) are secured to shaft 95 about which the matrix former M is rotated to the case rollover mechanism R. Shaft 95 is powered by an electric motor.

With reference now to FIGS. 20(a) and 20(b), the stack stripper includes a plurality of stripper fingers 440. The stripper fingers 440 are equally spaced so that when they are operated, a stripper finger 440 will engage the top of each stack of product P being transferred to the matrix former M. Stripper fingers 440 are integrally attached with a cross member 442. Cross member 442 is connected at its ends by links 444 and 446. Each link 444 and 446 is operably associated with a cam track 448 and 450 by way of a roller 452 and 454, respectively. Stripper fingers 440 are operated by way of an air cylinder 456 which causes movement of rollers 452 and 454 within associated cam track 448 and 450. In operation, the stack stripper 440 puts pressure on the top of the stacks in order to keep the stacks together for a clean transfer. After the transfer heads 80 rotate to the matrix former M, strippers 440 are pivoted between the two stationary jaws of each transfer head 80. The strippers 440 apply pressure to the top of the stacks. As the matrix former M is lowered, the strippers 440 are also lowered, thereby stripping the stacks off of transfer heads 80, as they follow the matrix former M downward. Once the last row of stacks have been transferred, and the transfer heads 80 are pivoted 270° back to the initial position, the divided matrix former M is compressed so that the volume within the matrix former M is decreased.

Figure 18B:
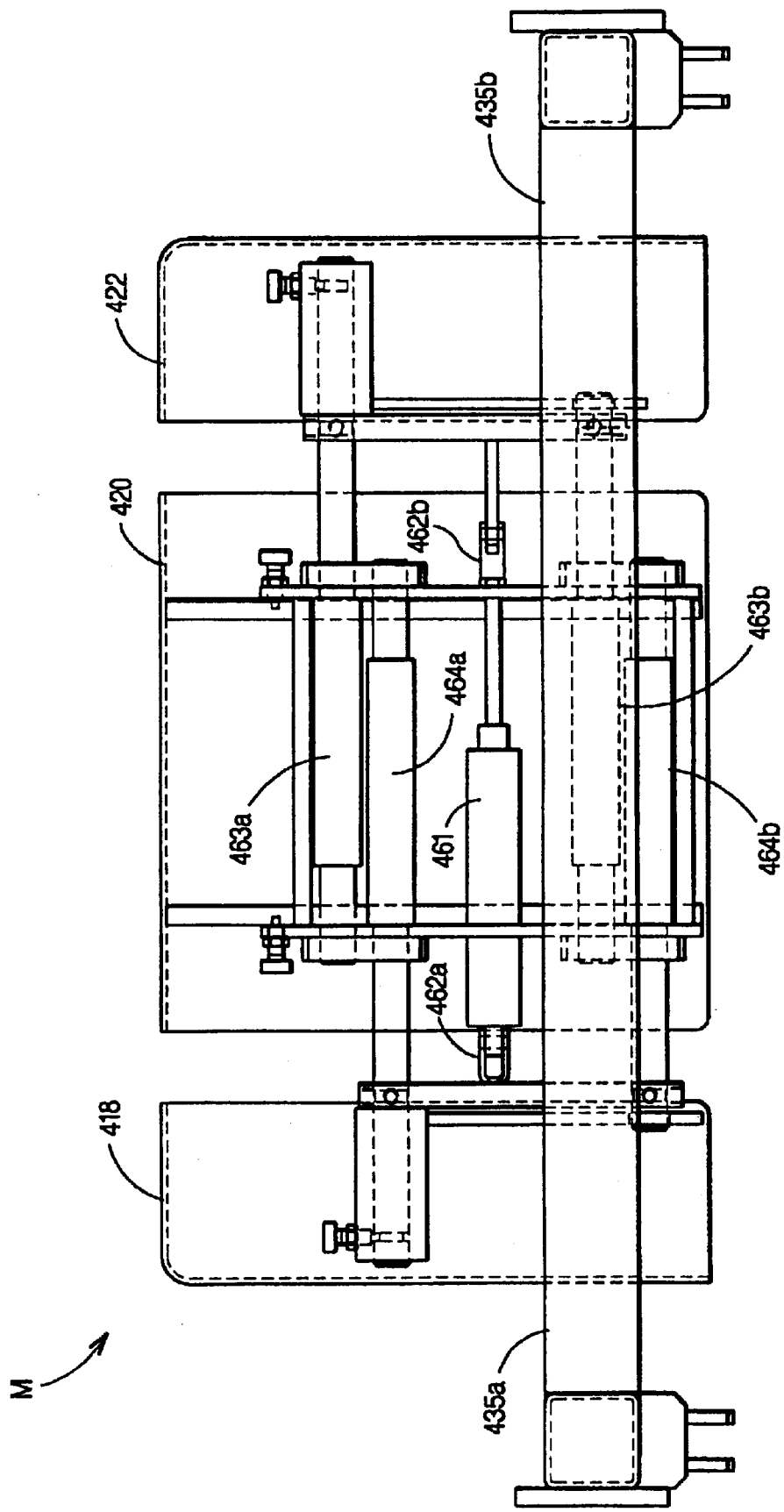
FIG. 18(b) is a bottom plan view with portions shown in phantom of a matrix former.

Matrix former M is reduced in length to gather the stacks together. Prior to placing the carton 104 over the matrix former M, reducing the matrix former M functions to gather the stacks together, while also permitting the carton 104 to be easily positioned over matrix former M. Sections 418 and 420 of base portion 410, and sections 420 and 422 of base portion of 410 are moved so that they are abutting. With reference now to FIG. 18(b), base section 418 is retracted toward base section 420, and base section 422 is retracted towards base section 420 by an air cylinder 461.

Air cylinder 461 is disposed beneath matrix former M and is secured to base sections 418 and 422 by brackets 462(a) and 462(b), respectively. Shafts 463(a) and 463(b) mount base sections 420 and 422 while shafts 464(a) and 464(b) mount base sections 418 and 420. In operation, as air cylinder 461 is retracted, the base section 422 is moved toward base section 420 by way of shafts 463(a) and 463(b). Once these sections are aligned and adjacent and can no longer move towards each other, sections 420 and 422 act as a support towards which the base section 418 is moved. Thus, section 418 is moved toward section 420 by way of shafts 464(a) and 464(b).

With reference to FIGS. 20(a) and 20(b), once the matrix former M is retracted, it is transferred towards wall 470. Wall 470 represents a fourth side for matrix former M, and provides a wall which aids in gathering the stacks. In addition, wall 470 allows a case to be easily placed over the matrix former M. However, once the case is placed over the matrix former M, wall 470 does not rotate with the matrix former M, and remains stationary through support 472 secured to frame member 474.

Figure 21:
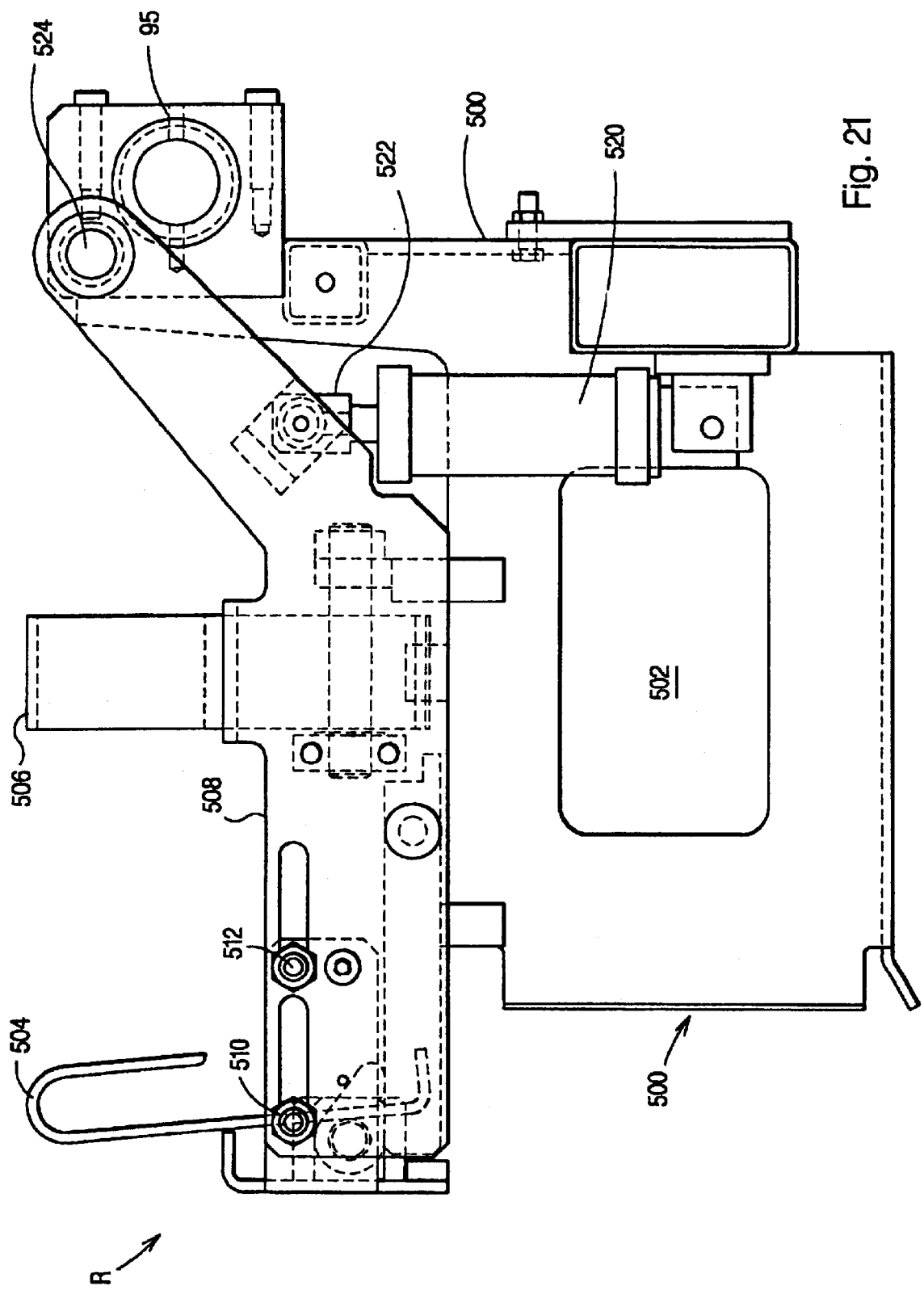
FIG. 21 is side elevational view with portions shown in phantom of the case rollover mechanism.

Case rollover mechanism R, as best shown in FIG. 21, preferably includes a rectangular support 500 having an opening 502. However, the shape and size of support 500 may be changed to accommodate cartons of various sizes. Nevertheless, in the preferred embodiment, support 500 is rectangular to allow for a rectangular carton to be nestled within support 500.

Case rollover mechanism R also includes three flap opening hooks 504, 506, with the third not being shown in the drawings. Hook 504 is secured to transfer mechanism 508, by nuts 510 and 512. Hook 504 has an associated cam 514, which pivots the hook from a first retracted position to a second upright position, as best shown in FIG. 21. It should be understood that hook 506 and the third hook (not shown)

function in an identical manner. It should also be understood that other ways known in the art may be used to pivot the hooks.

An air cylinder 520 is provided for pivoting transfer mechanism 508 about shaft 524. As clevis 522 of air cylinder 520 is extended, the transfer mechanism 508 is pivoted off of the support 500. Preferably, the transfer mechanism 508 pivots about 45° away from the support 500, to allow enough space so that a case can be inserted into the support 500. Once the case is inserted into the support 500, the transfer mechanism 508 is returned to its initial position adjacent support 500, thereby rotating the cams which function to open the flaps associated with each hook. Thus, three of the four flaps of the carton are opened, thereby securing the receptacle in the transfer mechanism 508.

In order to rotate the carton onto the matrix former M, the transfer mechanism 508 and the support 500 are pivoted in unison about shaft 95. The carton nestled within transfer mechanism 508 is rotated 180° onto the matrix former M. The matrix former M with transfer mechanism 508 is then rotated to the initial load position of the case rollover mechanism R. Once the matrix former M is rotated 180° counterclockwise to the load position of case rollover mechanism R, the matrix former M is raised to remove it from the case. The matrix former M is removed from the case, and rotated 180° clockwise to its home position. The matrix former M is then extended to increase its length, and the flap opening mechanism is released.

An operator will remove a filled case from the case rollover mechanism and load an empty case into the case rollover mechanism. This activates the flap opening mechanism to open three of the four flaps as described above. The system is ready to package another case and the process described above is repeated.

Figure 22:
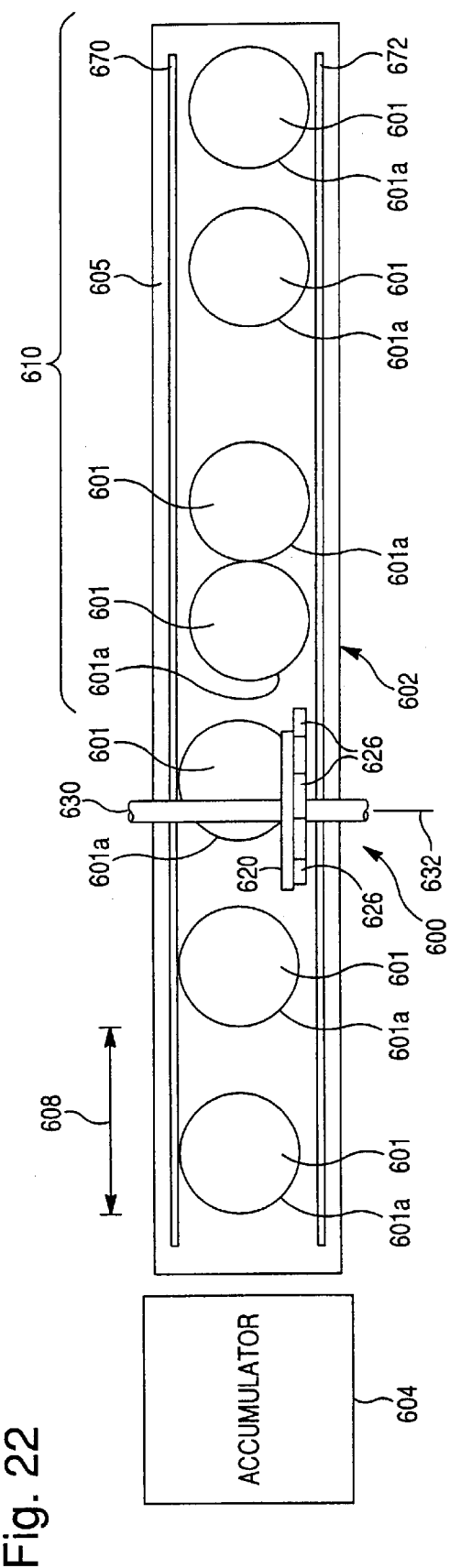
FIG. 22 is a top view of a conveyor that is equipped with an alternative timing mechanism.
Figure 23:
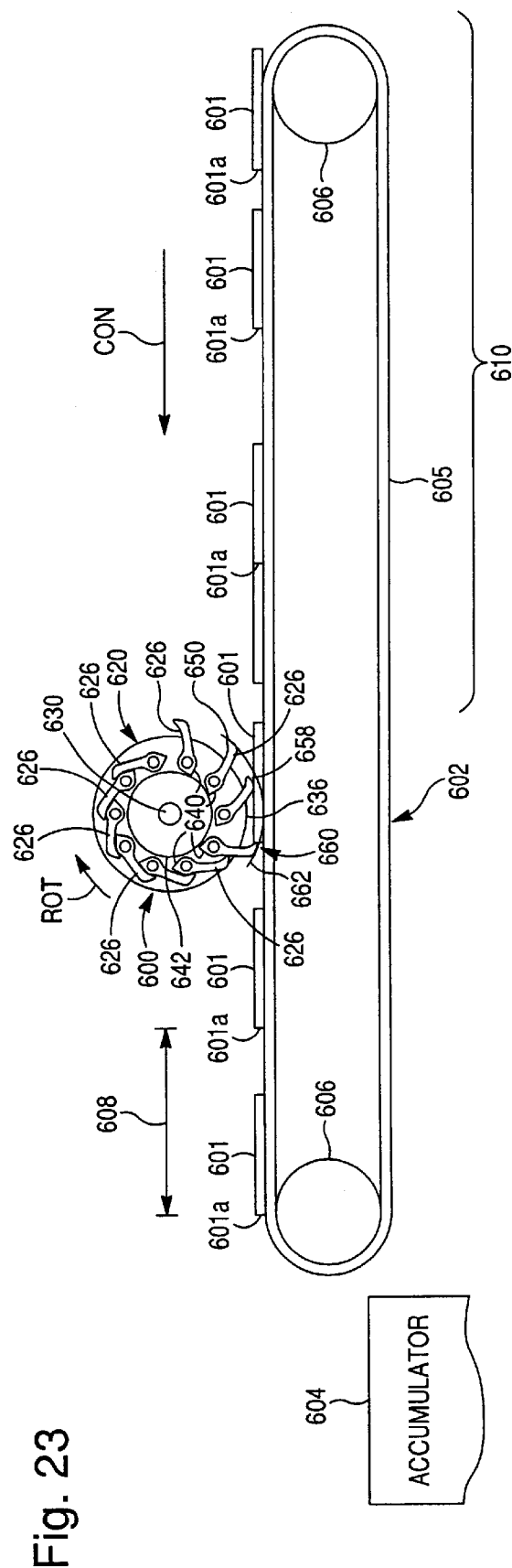
FIG. 23 is a side elevational view of the conveyor and timing mechanism illustrated in FIG. 22.

With reference to FIGS. 22 and 23, the present invention also provides an alterative timing mechanism to the sheets 50 in FIGS. 1–8. A preferred embodiment of the alternative timing mechanism is designated using reference numeral 600. The timing mechanism 600 can be used in connection with the lane combining conveyor system L and stack former F of FIGS. 1–8. Its use, however, is not limited to the equipment illustrated in FIGS. 1–8. To the contrary, the timing mechanism 600 can be used with other conveyors and accumulators of disk-like objects 601 (e.g., hamburger patties).

The exemplary timing mechanism 600 is shown in combination with a conveyor 602 of disk-like objects 601 and an accumulator 604 of the disk-like objects 601. The exemplary conveyor is a belt type conveyor 602 having a continuous belt 605 and rollers 606, one of which may be a drive roller 606. The conveyor 602 moves the objects 601 in the direction indicated by arrow CON.

An exemplary embodiment of accumulator 604 is shown in FIG. 1. It includes the coil type stacker 60 and the entry sheets 50. The coils 61 of the coil type stacker 60 are adapted to convey the disk-shaped objects 601 for packaging in a stacked relationship. The entry sheets 50 of stacker 60 may be eliminated as a result of the timing mechanism 600. Alternatively, the entry sheets 50 can be kept in the stacker 60 to further ensure that the disk-like objects 601 fall into the correct location along the length of the coil type stacker 60.

Preferably, the accumulator 604 is at an elevation below that of the conveyor 602 so that the disk-like objects 601 being conveyed by the conveyor 602 are dropped by the conveyor 602 into the accumulator 604. The timing mechanism 600 is operably associated with the conveyor 602 and is adapted to provide a predetermined spacing 608 between front edges 601A of successive disk-like objects 601 along the conveyor 602. Advantageously, the predetermined spacing 608 is provided even if successive ones of the disk-like objects reach the timing mechanism 600 in a randomly spaced manner. The nonuniform spacing is shown on the portion 610 of the conveyor belt 605 that has not reached the timing mechanism 600.

The timing mechanism 600 is operated so that the predetermined spacing 608 causes successive disk-like objects 601 to be dropped by the conveyor 602 into the accumulator 604 at moments in time when the accumulator 604 is ready to receive a disk-like object 601. For example, when the coil type stacker 60 is used as the accumulator 604, these moments in time correspond to when an opening in a coil 61 is positioned to receive one of the disk-like objects 601.

Preferably, the accumulator 604 is operated so that it is ready to receive a disk-like object 601 at uniformly spaced intervals of time. The timing mechanism 600, in this regard, can be adapted to provide the predetermined spacing 608 in a constant manner.

The timing mechanism 600 preferably comprises a rotatable body 620 and a plurality of fingers 626. The rotatable body 620 preferably is shaped like a wheel and is mounted on a rotatable shaft 630. The rotatable body 620 is adapted to rotate about an axis 632 that is substantially transverse to a conveying direction (indicated by arrow CON) of the conveyor 604. The direction of rotation is designated by arrow ROT in FIG. 23. The rotatable body 620 thus rotates so that a portion 636 thereof facing the conveyor 602 moves in the same direction as the disk-like objects 601 being transported by the conveyor 602.

The fingers 626 are pivotally mounted on the rotatable body 620. Each of the fingers 626 is adapted to pivot away from the rotatable body 620 to engage one of the disk-like objects 601 and to correct the spacing between the successive disk-like objects 601 when that spacing is inconsistent with the predetermined spacing 608. Preferably, the fingers 626 are gravity-actuatable so that, during rotation of the rotatable body 620, gravity causes the fingers 626 that are approaching the conveyor 602 to pivot away from the rotatable body 620 and causes the fingers 626 that are moving away from the conveyor 602 to pivot toward the rotatable body 620. Alternatively, the fingers 626 can be spring-biased to pivot away from the roatable body 620.

Preferably, each of the fingers 626 has a pivot limiting feature that keeps each finger 626 from pivoting beyond a predetermined angular orientation away from the rotatable body 620. In the exemplary embodiment, the pivot limiting feature is a lobe 640. When any finger 626 reaches the predetermined angular orientation, the lobe 640 bears against a bearing surface 642 of the rotatable body 620 and prevents further pivoting of the finger 626. Preferably, the predetermined angular orientation is reached before each finger 626 can reach a radial orientation with respect to the axis of rotation 632.

The predetermined angular orientation preferably is selected so that, while at least one finger 626 is pivoted to the predetermined angular orientation, a distal tip 650 of that one or more fingers 626 is far enough away from the rotatable body 620 to engage a front lateral edge 601A of a disk-like object 601 when that lateral edge 601A of the disk-like object 601 is located below the rotatable body 620 and within an engagement range of the conveyor 602. The engagement range has an entrance 658 and an exit 660. The entrance 658 defines an engagement point where the distal tip 650 of the finger 626 is able to engage a moving disk-like object 601. The exit 660 defines a release point where the disk-like object 601 is released by the finger 626 and is free to be carried along by the conveyor 602 at the speed of the conveyor 602. Because of the lobe 640 of each finger 626, the radially outermost sweep of the distal tips 650 is defined by the arc 662. The timing mechanism 600 keeps any disk-like object 601 that happens to be located below it from being released until the release point at exit 660 is reached by the distal end 650 of the finger 626 that engages the front edge 601A of that disk-like object 601. Preferably, the speed of the conveyor 602 is substantially equal to the distance separating the entrance 658 from the exit 660 of the engagement range plus the predetermined spacing 608 of the front edges 601A of the objects 601, divided by the time it takes for one of the fingers 626 to traverse the engagement range.

Preferably, the rotatable body 620 rotates at a speed that causes succesive ones of the fingers 626 to exit the engagement range at temporally spaced intervals, the temporally spaced intervals being substantially equal in duration to the time between the moments in time when the accumulator 604 is ready to receive a disk-like object 601. The rate of rotation preferably is faster than the equilibrium rate that is required to make the time it takes for one finger 626 to pass through the engagement range equal the average period of time between introduction of successive products at the upstream end of the conveyor 602. Use of a rate faster than the equilibrium rate advantageously prevents the objects 601 from becoming backlogged at the timing mechanism 600. An exemplary rate is 5% faster, however, it will be appreciated that the invention is not limited to the exemplary rate. Generally, the greater the difference in speed between the faster rate of rotation and the equilibrium rate, the greater will be the number of times that a finger 626 skips past the engagement range without engaging a front lateral edge of an object 601. This increased rate of skipping corresponds to an increase in the number of times the accumulator is ready to receive an object 601 but an object fails to drop from the conveyor 602.

The number of fingers 626 preferably is sufficient and they are spaced sufficiently close to one another that at least one of the fingers 626 is located in the engagement range during all rotational orientations of the rotatable body 620. In addition, the fingers 626 preferably are spaced apart from one another in such a way that, when two successive ones of the fingers 626 are pivoted to the predetermined angular orientation, respective distal tips 650 of the two fingers 626 are separated by a distance that is smaller than a diameter of the disk-like objects 601.

Preferably, the rotatable body 620 rotates at a speed sufficient to perform an entire revolution every N seconds, wherein N is substantially equal to the number of fingers 626 on the rotatable body 620 multiplied by the number of seconds that elapse between the moments in time when the accumulator 604 is ready to receive a disk-like object 601.

The rotatable body 620 and the fingers 626 preferably are arranged so that the predetermined spacing 608 between front edges 601 A of successive disk-like objects 601, after such objects 601 pass below the timing mechanism 600, is substantially equal to a speed of the conveyor 602 multiplied by the time between the moments in time when the accumulator 604 is ready to receive a disk-like object 601.

Preferably, the conveyor 602 further comprises longitudinally extending guides 670,672 between which the disk-like objects 601 are conveyed. The guides 670,672 have been omitted from FIG. 23 to permit visualization of the entire timing mechanism 600 and the objects 601. The fingers 626 can be adapted to cause the disk-shaped objects 601 to become wedged against one of the guides 670. This, in turn, prevents movement of the disk-shaped object 601 beyond the exit 660 (i.e., the release point) of the engagement range of the timing mechanism 600 until the predetermined spacing 608 has been achieved. To provide such wedging, the rotatable body 620 is mounted to the shaft 630 at a position along the length of the shaft 630 closer to the guide 672 than guide 670.

The foregoing timing mechanism 600 facilitates timing of drops of the disk-shaped objects 601 into the accumulator 604. A method of timing such drops, for example, comprises the steps of:

conveying disk-shaped objects 601 along the conveyor 602 in sequential order, the objects 601 being randomly spaced from one another prior to reaching the timing mechanism 600;

engaging the objects 601 with the timing mechanism 600 when the objects 601 reach the timing mechanism 600;

preventing further movement of a disk-shaped object 601 engaged by the timing mechanism 600 until a predetermined spacing 608 is achieved between a sequentially prior disk-shaped object 601 that has been released by the timing mechanism 600 and the disk-shaped object 601 engaged by the timing mechanism 600;

releasing the disk-shaped object 601 engaged by the timing mechanism 600 for further conveyance along the conveyor 602, beyond the timing mechanism 600, when the predetermined spacing 608 has been achieved; and dropping the disk-shaped objects 601 from the conveyor 602 into the accumulator 604 when the disk-shaped objects 601 reach an end of the conveyor 602, the accumulator 604 being located at an elevation below an elevation of the conveyor 602.

While FIGS. 22 and 23 show only one timing mechanism 600, it is understood that multiple timing mechanisms 600 can be provided when the conveyor 602 has multiple lanes, or when multiple conveyors 602 are provided. Each lane can have its own timing mechanism 600. Each timing mechanism 600 can include the exemplary rotatable body 620 and a plurality of fingers 626 adapted to provide the predetermined spacing 608. The rotatable bodies 620 can be mounted on the same or a different shaft 630.

Advantageously, the foregoing timing mechanism 600 and the associated method do not require a backlog of product upstream from the timing mechanism 600 or upstream from the accumulator 604. Several prior timing devices typically required such a backlog to insure proper infeed timing. This was done to avoid the possibility of infeed jams caused by randomly positioned product. The foregoing timing mechanism 600 and the associated method therefore eliminate the need to control a backlog using both high and low level sensing devices. These sensing devices, in prior art arrangments, would provide a signal which is used to control the upstream and/or downstream production rates to keep the backlog at an appropriate size. The problem of controlling the backlog becomes increasingly difficult, however, when multiple lanes of product are being processed simultaneously.

While this invention has been described as having a preferred design, it is understood that the invention is capable of further modifications, uses, and/or adaptations which follow in general the principal of the present invention and include such departures from the present disclosure as come within known or customary practice in the art to which the invention pertains and that may be applied to the central features here and before set forth and fall within the scope of the limits of the appended claims.

What is claimed is:

1. A timing mechanism in combination with a conveyor of disk like objects and an accumulator of the disk-like objects, wherein the accumulator is at an elevation below that of the conveyor so that disk-like objects being conveyed by the conveyor are dropped by the conveyor into the accumulator, said timing mechanism being operably associated with said conveyor and being adapted to provide a predetermined spacing between front edges of successive ones of the disk-like objects along the conveyor, wherein said timing mechanism comprises a body rotatable about an axis extending substantially transverse to a conveying direction of the conveyor; and a plurality of fingers pivotally mounted on the rotatable body and rotatable therewith, each of said fingers pivotable away from the rotatable body for engaging the disk-like objects and spacing successive disk-like objects a predetermined distance along said conveyor.

2. The timing mechanism of claim 1, wherein said accumulator is adapted to receive a disk-like object at uniformly spaced intervals of time, and wherein said timing mechanism is adapted to provide said predetermined spacing in a constant manner.

3. The timing mechanism of claim 1, wherein said plurality of fingers are gravity-actuatable so that, during rotation of the rotatable body, gravity causes the fingers that are approaching the conveyor to pivot away from the rotatable body and causes the fingers that are moving away from the conveyor to pivot toward the rotatable body.

4. The timing mechanism of claim 1, wherein said rotatable body rotates so that a portion thereof facing the conveyor moves in the same direction as the disk-like objects being transported by the conveyor.

5. The timing mechanism of claim 1, wherein each of said plurality of fingers has a pivot limiting feature that keeps each finger from pivoting beyond a predetermined angular orientation away from the rotatable body.

6. The timing mechanism of claim 5, wherein said predetermined angular orientation is reached before each pivot finger can reach a radial orientation with respect to an axis of rotation of the rotatable body.

7. The timing mechanism of claim 6, wherein said predetermined angular orientation is selected so that, while at least one finger is pivoted to the predetermined angular orientation, a distal tip of said at least one finger is far enough away from the rotatable body to engage a front lateral edge of a disk-like object when that lateral edge of the disk-like object is located below the rotatable body and within an engagement range of the conveyor.

8. The timing mechanism of claim 7, wherein said rotatable body rotates at a speed that causes succesive ones of said plurality of fingers to exit the engagement range at temporally spaced intervals, said temporally spaced intervals being substantially equal in duration to the time between said moments in time when the accumulator is ready to receive a disk-like object.

9. The timing mechanism of claim 7, wherein said plurality of fingers are provided in sufficient number and are spaced sufficiently close to one another that at least one of said plurality of fingers is located in said engagement range during all rotational orientations of the rotatable body.

10. The timing mechanism of claim 6, wherein said plurality of fingers are spaced apart from one another in such a way that, when two successive ones of said plurality of fingers are pivoted to the predetermined angular orientation, respective distal tips of said two fingers are separated by a distance that is smaller than a diameter of said disk-like objects.

11. The timing mechanism of claim 6, wherein said rotatable body rotates at a speed sufficient to perform an entire revolution every N seconds, wherein N is substantially equal to the number of fingers on the rotatable body multiplied by the number of seconds that elapse between said moments in time when the accumulator is ready to receive a disk-like object.

12. The timing mechanism of claim 6, wherein said rotatable body and said plurality of fingers are arranged so that said predetermined spacing between front edges of successive disk-like objects, after passing below said timing mechanism, is substantially equal to a speed of the conveyor multiplied by the time between said moments in time when the accumulator is ready to receive a disk-like object.

13. The timing mechanism of claim 12, wherein said predetermined angular orientation is selected so that, while at least one finger is pivoted to the predetermined angular orientation, a distal tip of said at least one finger is far enough away from the rotatable body to engage a front lateral edge of a disk-like object when that lateral edge of the disk-like object is located below the rotatable body and within an engagement range of the conveyor;

wherein said engagement range has an entrance and an exit;

wherein the speed of the conveyor is substantially equal to the distance separating said entrance from said exit plus said predetermined spacing, divided by the time it takes for one of said plurality of fingers to traverse said engagement range.

14. The timing mechanism of claim 1, wherein said conveyor further comprises longitudinally extending guides between which said disk-like objects are conveyed, said fingers being adapted to cause said disk-shaped objects to become wedged against one of said guides, to prevent movement of said disk-shaped object beyond an exit of an engagement range of the timing mechanism until said predetermined spacing has been achieved.

15. The timing mechanism of claim 1, wherein said conveyor is divided into multiple lanes, each lane having a respective body and plurality of fingers to provide said predetermined spacing.

16. The timing mechanism of claim 1, wherein said accumulator comprises a coil adapted convey said disk-shaped objects for packaging in a stacked relationship.

17. A conveyance and timing system comprising:

a conveyor for conveying a plurality of disk-like objects;

an accumulator for accumulating the disk-like objects, said accumulator operably associated with said conveyor and positioned below said conveyor so that disk-like objects are dropped by said conveyor into the accumulator; and a timing mechanism operably associated with said conveyance means, for providing a predetermined spacing between front edges of successive ones of the disk-like objects along the conveyor;

wherein said timing mechanism comprises:

a body rotatable about an axis extending substantially transverse to a conveying direction of the conveyor; and a plurality of fingers pivotally mounted on said body and rotatable therewith, each of the fingers pivotable about a pivot axis extending parallel to said body axis of rotation for engaging and spacing the disk-like objects a predetermined distance apart.

18. The conveyance and timing system of claim 17, wherein said accumulator is adapted to receive a disk-like object at uniformly spaced intervals of time, and wherein said timing mechanism is adapted to provide said predetermined spacing in a constant manner.

19. A method of timing drops of disk-shaped objects into an accumulator, comprising the steps of:

conveying disk-shaped objects along a conveyor in sequential order, the disk-shaped objects being randomly spaced from one another;

rotating a body having a plurality of pivotal fingers and thereby pivoting each finger about an axis extending parallel to the body axis of rotation;

engaging a disk-shaped object with a pivoted finger;

preventing further movement of a disk-shaped object engaged by the pivoted finger until a predetermined spacing is achieved between a sequentially prior disk-shaped object that has been released by an associated finger and the disk-shaped object engaged by the pivoted finger;

releasing the disk-shaped object engaged by the pivoted finger for further conveyance along the conveyor when the predetermined spacing has been achieved; and dropping the disk-shaped objects from the conveyor into the accumulator when the disk-shaped objects reach an end of the conveyor, the accumulator being located at an elevation below an elevation of the conveyor.

* * * * *